United States Patent
Oteki et al.

(10) Patent No.: US 7,123,385 B2
(45) Date of Patent: Oct. 17, 2006

(54) IMAGE PROCESSING APPARATUS

(75) Inventors: Sugitaka Oteki, Tokyo (JP); Yoshiyuki Namizuka, Kanagawa (JP); Yuji Takahashi, Kanagawa (JP); Hideto Miyazaki, Kanagawa (JP); Yasuyuki Nomizu, Kanagawa (JP); Hiroyuki Kawamoto, Kanagawa (JP); Rie Ishii, Tokyo (JP); Takeharu Tone, Tokyo (JP); Shinya Miyazaki, Tokyo (JP); Fumio Yoshizawa, Kanagawa (JP); Hiroaki Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 760 days.

(21) Appl. No.: 09/770,214

(22) Filed: Jan. 29, 2001

(65) Prior Publication Data

US 2001/0019429 A1   Sep. 6, 2001

(30) Foreign Application Priority Data

Jan. 31, 2000 (JP) ............................. 2000-023132

(51) Int. Cl.
*H04N 1/04* (2006.01)

(52) U.S. Cl. .................. 358/474; 358/468; 358/496; 358/498; 358/1.15; 399/364

(58) Field of Classification Search ................ 358/444, 358/496, 498, 300, 296, 468; 355/23, 24; 399/374, 364
See application file for complete search history.

(56) References Cited

U.S. PATENT DOCUMENTS

| 5,050,221 | A | | 9/1991 | Ohta et al. |
| 5,349,419 | A | * | 9/1994 | Taguchi et al. ............... 355/22 |
| 5,508,811 | A | * | 4/1996 | Abe et al. .................... 358/296 |
| 5,619,343 | A | * | 4/1997 | Amemiya .................... 358/408 |
| 5,703,693 | A | * | 12/1997 | Morikawa .................... 358/296 |
| 5,745,253 | A | * | 4/1998 | Muramatsu et al. ........ 358/408 |
| 5,815,289 | A | * | 9/1998 | Yoshida et al. ............. 358/468 |
| 5,870,648 | A | * | 2/1999 | Sakaki et al. ................. 399/66 |
| 5,897,251 | A | * | 4/1999 | Kato et al. .................. 399/408 |
| 5,966,556 | A | * | 10/1999 | Nakagawa et al. ........... 399/18 |
| 6,041,139 | A | | 3/2000 | Okubo et al. |
| 6,144,777 | A | * | 11/2000 | Tada et al. .................. 382/284 |
| 6,151,457 | A | | 11/2000 | Kawamoto |
| 6,172,774 | B1 | * | 1/2001 | Yamashita .................. 358/474 |
| 6,246,487 | B1 | * | 6/2001 | Kobayashi et al. ........ 358/1.13 |
| 6,320,674 | B1 | * | 11/2001 | Soma et al. ................. 358/1.9 |
| 6,354,589 | B1 | * | 3/2002 | Taruki et al. .......... 271/265.01 |

(Continued)

FOREIGN PATENT DOCUMENTS

JP    1-162071    6/1989

(Continued)

OTHER PUBLICATIONS

U.S. Appl. No. 09/024,290, filed Feb. 17, 1998, Allowed.

(Continued)

*Primary Examiner*—Douglas Q. Tran
*Assistant Examiner*—Negussie Worku
(74) *Attorney, Agent, or Firm*—Oblon, Spivak, McClelland, Maier & Neustadt, P.C.

(57) ABSTRACT

The image processing apparatus comprises a reading unit which simultaneously reads image data from two, an obverse and a reverse, surfaces of a document, and a compressing unit which compresses received image data. The apparatus further comprises a controlling unit which orchestrates a flow of image data from the reading unit to the compressing unit in such a manner that the image data corresponding to the obverse surface and the reverse surface is input into the compressing unit at different timing.

28 Claims, 18 Drawing Sheets

U.S. PATENT DOCUMENTS 6,438,350 B1 * 8/2002 Hasegawa et al. .......... 399/374

FOREIGN PATENT DOCUMENTS

| JP | 7-58945 | 3/1995 |
| JP | 8-137830 | 5/1996 |
| JP | 9-200437 | 7/1997 |
| JP | 10-262133 | 9/1998 |
| JP | 10-336396 | 12/1998 |
| JP | 10-336462 | 12/1998 |
| JP | 11-17955 | 1/1999 |
| JP | 2001-186355 | 7/2001 |

OTHER PUBLICATIONS

U.S. Appl. No. 09/122,108, filed Jul. 24, 1998, Pending.
U.S. Appl. No. 09/161,225, filed Sep. 28, 1998, Pending.
U.S. Appl. No. 09/266,800, filed Mar. 12, 1999, Pending.
U.S. Appl. No. 09/262,317, filed Mar. 4, 1999, Pending.
U.S. Appl. No. 09/348,631, filed Jul. 6, 1999, Pending.
U.S. Appl. No. 09/437,088, filed Nov. 9, 1999, Pending.
U.S. Appl. No. 09/443,889, filed Nov. 19, 1999, Pending.
U.S. Appl. No. 09/468,954, filed Dec. 22, 1999, Pending.
U.S. Appl. No. 09/484,254, filed Jan. 18, 2000, Pending.
U.S. Appl. No. 09/551,509, filed Apr. 17, 2000, Pending.
U.S. Appl. No. 09/770,214, filed Jan. 29, 2001, Pending.
U.S. Appl. No. 09/772,945, filed Jan. 31, 2001, Pending.
U.S. Appl. No. 09/770,214, filed Jan. 29, 2001, Oteki et al.
U.S. Appl. No. 10/360,749, Feb. 10, 2003, Namizuka.
U.S. Appl. No. 10/393,945, filed Mar. 24, 2003, Namizuka.
U.S. Appl. No. 10/632,957, filed Aug. 4, 2003, Namizuka.
U.S. Appl. No. 10/646,754, filed Aug. 25, 2003, Kodama et al.
U.S. Appl. No. 10/647,337, filed Aug. 26, 2003, Sakuyama et al.
U.S. Appl. No. 10/659,349, filed Sep. 11, 2003, Nomizu et al.
U.S. Appl. No. 09/770,214, filed Jan. 29, 2001, Oteki et al.
U.S. Appl. No. 10/663,804, filed Sep. 17, 2003, Togami et al.
U.S. Appl. No. 10/682,121, filed Oct. 10, 2003, Hara et al.
U.S. Appl. No. 10/687,625, filed Oct. 20, 2003, Kawamoto et al.
U.S. Appl. No. 10/691,623, filed Oct. 24, 2003, Hara et al.
U.S. Appl. No. 10/716,463, Nov. 20, 2003, Kodama et al.
U.S. Appl. No. 10/717,674, filed Nov. 21, 2003, Sakuyama et al.
U.S. Appl. No. 10/716,429, filed Nov. 20, 2003, Nomizu et al.
U.S. Appl. No. 10/797,129, filed Mar. 11, 2004, Nomizu.
U.S. Appl. No. 10/805,184, filed Mar. 22, 2004, Namizuka
U.S. Appl. No. 10/663,784, filed Sep. 17, 2003, Shirata et al.
U.S. Appl. No. 10/668,360, Sep. 24, 2003, Ohyama et al.
U.S. Appl. No. 10/703,509, filed Nov. 10, 2003, Nomizu et al.

* cited by examiner

# IMAGE PROCESSING APPARATUS

FIELD OF THE INVENTION

The present invention in general relates to an image processing apparatus. More specifically, this invention relates to an image processing apparatus that reads both the surfaces of a document and performs specific image processing.

BACKGROUND OF THE INVENTION

Various kinds of image processing apparatuses are known. In recent years, there has been an image processing apparatus capable of processing a double-sided document having images printed on both sides thereof in consideration of environment. When information written in a double-sided document is filed in a double-sided copying machine or a double-sided electronic filing apparatus, the document is read by an image reader such as an image scanner.

In order to compensate the function of reading only either side of a document in a simple image reader, the document is turned over by an operator after the obverse of the document is read, and then, the reverse of the document is read. Otherwise, in a simple double-sided image reader, a document is turned over by a mechanical mechanism after the obverse of the document is read, and subsequently, the reverse of the document is read.

However, the image reader which reads only either side of a document places a significant burden on a user, and further, inconveniently takes much time to read the document. In the meantime, in the double-sided image reader having a mechanical turning-over function, there may accidentally occur drawbacks caused by the mechanical mechanism, for example, paper jamming in turning-over, or mechanical failures. In order to eliminate such inconveniences, there has been known an image processing apparatus including respective readers for both of the obverse and the reverse of a document, in which the readers simultaneously read images of the obverse and the reverse of the document. The use of such an image reader can achieve image processing of double-sided copying or the like at a high speed with few failures.

Now, a digital combined machine having a double-sided copying function will be explained as one example of conventional image processing apparatuses for performing double-sided reading. FIG. 15 is a block diagram illustrating one example of the configuration of a conventional double-sided copying machine. As illustrated in FIG. 15, the digital combined machine comprises a series of constituent units such as a reading unit 1501, an image processing unit 1502, a video controller 1503 and a writing unit 1504; component elements constituting a copying machine (i.e., the section of a copying machine) consisting of a memory control unit 1505 and a memory module 1506; a process controller 1511, a RAM 1512 and a ROM 1513; and various units such as a facsimile control unit 1512, a printer control unit 1513 and a scanner control unit 1514 which are additionally connected via a motherboard 1511.

The motherboard 1511 is constituted of an obverse image transfer bus 1515a for transferring obverse image data and a reverse image transfer bus 1515b for transferring reverse image data. These buses are normally required to transfer image data, which are simultaneously read by the reading unit 1501, at the same timing with the same data structure. Furthermore, the two image transfer buses are required also to input the image data on both sides of a document read by the scanner control unit 1514 installed externally.

The reading unit 1501 is constituted of an obverse reading unit 1501a for reading the obverse of the document and a reverse reading unit 1501b for reading the reverse of the document. In the same manner, the image processing unit 1502 is constituted of an obverse image processing unit 1502a and a reverse image processing unit 1502b. Furthermore, the video controller 1503 is constituted of an obverse video controller 1503a and a reverse video controller 1503b.

When both sides of the document are read in the image processing apparatus, the volume of the image data input at the same time is twice in comparison with that in the image processing apparatus which reads only either side of the document. Consequently, the read image data is compressed such that the image data is efficiently stored in the memory module 1506 or the image data is efficiently transferred via the various buses.

How the image data is compressed will be explained here. FIG. 16 is a block diagram illustrating one example of the configuration of a data compressor in the memory control unit 1505; and FIG. 17 is a timing chart illustrating the processing timings thereof.

In FIG. 16, the data compressor 1601 comprises: an obverse storage 1602a and a reverse storage 1602b for storing therein obverse image data and reverse image data, respectively; an obverse compressor 1603a and a reverse compressor 1603b for compressing the obverse image data and the reverse image data, respectively; and a controller 1604 for controlling the obverse storage 1602a, the reverse storage 1602b, the obverse compressor 1603a and the reverse compressor 1603b.

The alphabetic subscripts a and b will hereinafter designate constituent elements relevant to the obverse image data and the reverse image data, respectively, wherein they are not attached when they need not be specially distinguished from each other.

The storage 1602 includes a line memory group 1605 consisting of a plurality of 1-port FIFO memories FM1, FM2, FM3, FM4 and FM5; an output switch 1606 for switching the output destination of the image data; and an input switch 1607 for switching the input source of the image data between the FIFO memories FM1 and FM2.

Incidentally, for the sake of simple explanation, a region to be compressed by the compressor 1603 is assumed to be a rectangular region consisting of four pixels per line multiplied by four lines, that is, four pixels in a main scanning (pixel) direction and four lines in a sub scanning (line) direction, as illustrated in FIG. 18.

As illustrated in FIG. 17, with respect to the compression of image data on the obverse, image data on a first line in the rectangular region of the obverse is written in the FIFO memory FM1a. Next, image data on a second line is written in the FIFO memory FM3a; image data on a third line is written in the FIFO memory FM4a; and image data on a fourth line is written in the FIFO memory FM5a, in sequence. The image data at this time is divided by the obverse output switch 1606a under the control of the controller 1604.

In the stage in which the image data is written in the FIFO memory FM5a, there appear all of the four lines to be compressed by the obverse compressor 1603a. Subsequently, the image data on the first to fourth lines stored in the FIFO memories FM1a, FM3a, FM4a and FM5a, respectively are read out, to be transmitted to the obverse compressor 1603a. This transmission is controlled by the controller 1604. The obverse compressor 1603a compresses the image data on the four lines as a single unit, and then, outputs the compressed image data. The compressed image data is then stored in the memory module 1506.

In the meantime, after the image data on the fourth line is written in the FIFO memory FM5a, image data on a first line in a next rectangular region (i.e., image data on a fifth line) of the obverse is input. The controller 1604 controls to write the image data on the fifth line in the FIFO memory FM2a in order to avoid a memory conflict.

Thereafter, image data on a sixth line is written in the FIFO memory FM3a; image data on a seventh line is written in the FIFO memory FM4a; and image data on an eighth line is written in the FIFO memory FM5a, in sequence.

The controller 1604 reads the image data on the fifth to eighth lines stored in the FIFO memories FM2a to FM5a, respectively, to thus transmit them to the obverse compressor 1603a, while controlling to write image data on a ninth line in a next rectangular region in the FIFO memory FM1a. A series of sequentially input image data on the obverse can be compressed without any hitch by repeating the above-described processing.

In the meanwhile, the image data on the reverse of the document also is input into the data compressor 1601 together with the image data on the obverse. Since the processing of the image data on the reverse is the same as that of the image data on the obverse, the explanation thereof will be omitted here. Compressing operation is repeated every four lines under the control of the controller 1604, so that a series of sequentially input image data on the reverse can be compressed without any hitch.

In this way, since double processing is required in comparison with the processing of the data on either one side when the image data on both sides of the document are input, the data compressing processing has become an important factor for the performance of the apparatus including ease of use of the apparatus. In other words, the conventional image processing apparatus for performing double-sided reading is provided with two compressors for the obverse image data and the reverse image data, for inputting the image data on the obverse and the reverse at a high speed and efficiently transferring and storing the data.

Furthermore, as an apparatus for performing double-sided reading has been devised an apparatus for effectively using a reverse image processing unit block in reading one side of a document which has an image only at the obverse ("an image reader" disclosed in Japanese Patent Application Laid-Open (JP-A) No. 10-336396).

However, the conventional image processing apparatus for performing double-sided reading at the same time must be provided with two compressors and two data buses for the obverse and the reverse. Thus, there has arisen a problem of the unwieldy size of a processing circuit.

In particular, in a digital combined machine in which functional units are provided independently of each other and they can be replaced when the function is enhanced, the size of the machine need be reduced as possible in view of the configuration of the machine.

SUMMARY OF THE INVENTION

It is an object of the present invention to provide an image processing apparatus in which the size of a processing circuit can be reduced, and further, both of the obverse and reverse of a document can be read at the same time.

The image processing apparatus according to one aspect of the present invention has a reading unit which simultaneously reads image data from two, an obverse and a reverse, surfaces of a document; a compressing unit which compresses receive image data. The image processing apparatus further comprises a controlling unit which orchestrates a flow of image data from the reading unit to the compressing unit in such a manner that the image data corresponding to the obverse surface and the reverse surface is input into the compressing unit at different timing. Thus, the processing circuit can be shared by shifting the timings of the image processing of the obverse image data and the image processing of the reverse image data.

The image processing apparatus according to another aspect of the present invention comprises a reading unit which simultaneously reads image data from two, an obverse and a reverse, surfaces of a document; a storing unit which receives and stores therein the image data read by the reading unit; a compressing unit which receives and compresses the image data stored in the storing unit; and a controlling unit which orchestrates compression of the image data stored in the storing unit by the compressing unit in such a manner that the image data corresponds to the obverse surface and the reverse surface is compressed at different timing. Thus, it becomes possible to compress the obverse and reverse image data with only one compressing unit.

The image processing apparatus according to still another aspect of the present invention comprises a reading unit which simultaneously reads image data from two, an obverse and a reverse, surfaces of a document; a data dividing unit which divides the image data acquired by the reading unit from the obverse surface and reverse surface respectively into image data of m×n pixels, where n is the number of lines and m is the number of pixels in one line, and n<N and m<M where N is the maximum number of scan lines, and M is the maximum number of pixels in one lines; a storing unit which receives the image data of first m×(n−1) pixels, corresponding to the obverse surface and the reverse surface, from the data dividing unit, and stores the data therein; a compressing unit which receives the image data of m×n pixels and compresses the image data as a single unit; a switch unit which controls a flow of the image data from the storing unit to the compressing unit, wherein the switch unit allows either the image data corresponding to the obverse surface or the reverse surface to be input into the compressing unit at one time; and a transmission controlling unit which controls a flow of the image data from the data dividing unit to the storing unit and to the compressing unit, wherein the transmission controlling unit allows the image data of first m×(n−1) pixels from the data dividing unit to be input into the storing unit, and allows the image data of last m pixels from the data dividing unit to be directly input into the compressing unit. Thus, it becomes possible to compress the obverse and reverse image data with only one compressing unit. Further, since image data corresponding only to m×(n−1) pixels is stored in storing unit, it becomes possible to reduce memory size of the storing unit and thereby reduce the cost.

The image processing apparatus according to still another aspect of the present invention comprises a reading unit which simultaneously reads image data from two, an obverse and a reverse, surfaces of a document; an appending unit which receives the image data acquired by the reading unit appends identifying information to the image data for identifying whether the image data corresponds to the obverse surface or to the reverse surface; and a communication line to be used to send the identifying information appended image data corresponds to the obverse surface and the reverse surface; an obverse image processing unit which obtains, based on the appended identifying information, only the image data corresponding to the obverse surface from the communication line, and performs specific image processing to the obtained image data; and a reverse image processing unit which obtains, based on the appended identifying information, only the image data corresponding to the reverse surface from the communication line, and performs specific image processing to the obtained image data. Thus, it becomes possible to identify whether the image data read by the reading unit is the obverse image data or the reverse image data, and to transmit or receive the obverse and reverse image data via the same data bus without any necessity of providing a data bus for each of the obverse processing and the reverse processing.

Other objects and features of this invention will become apparent from the following description with reference to the accompanying drawings.

DESCRIPTION OF THE PREFERRED EMBODIMENTS

Preferred embodiments of the image processing apparatus according to the present invention will be described below in reference to the drawings.

Figure 1:
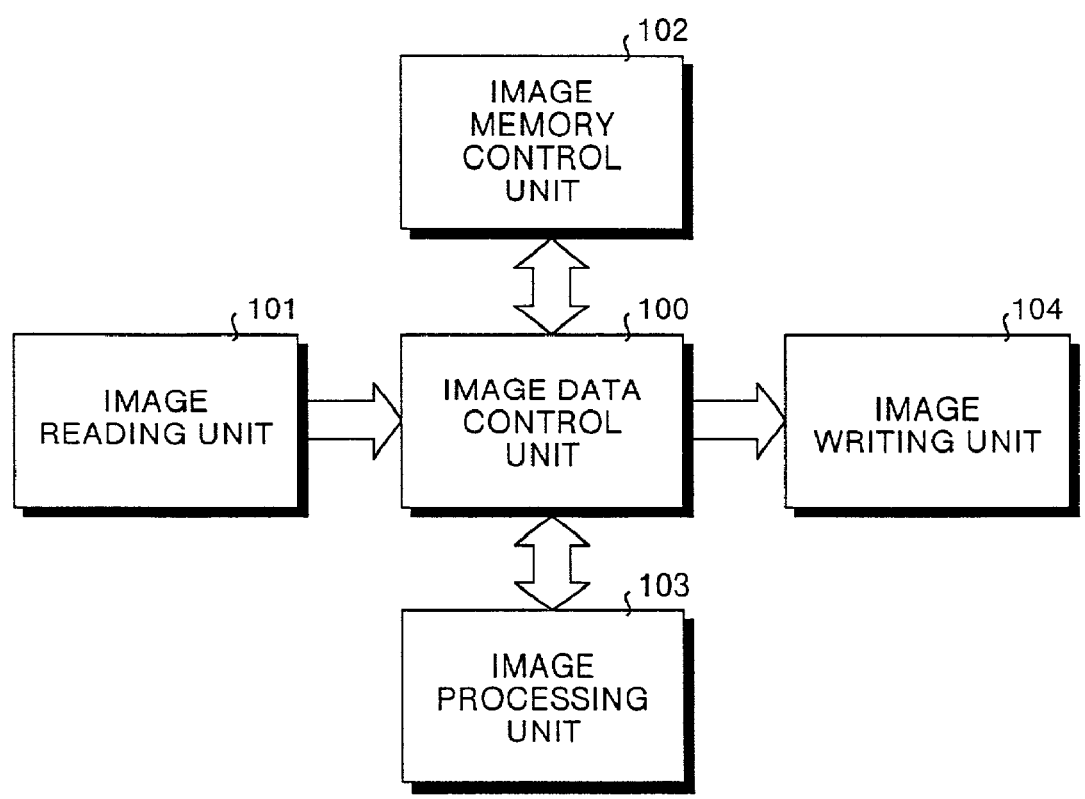
FIG. 1 is a block diagram functionally illustrating the arrangement of an image processing apparatus in a first embodiment according to the present invention.

The principle of the image processing apparatus which is common to all the embodiments will be explained here. FIG. 1 is a block diagram functionally illustrating the arrangement of the image processing apparatus in the preferred embodiment according to the present invention. The image processing apparatus includes five units.

That is, the image processing apparatus includes an image data control unit 100; an image reading unit 101 for reading and inputting image data; an image memory control unit 102 for controlling an image memory for storing an image therein so as to write/read the image data; an image processing unit 103 for subjecting the image data to image processing such as edition; and an image writing unit 104 for writing the image data in a transfer sheet or the like.

The above-described units are arranged centering on the image data control unit 100: namely, the image reading unit 101, the image memory control unit 102, the image processing unit 103 and the image writing unit 104 are connected to the image data control unit 100.

The image data control unit 100 undertakes, for example, following processing:

(1) data compressing processing (primary compression) for the purpose of enhancing the bus transfer efficiency of data;
(2) processing of transferring the primarily compressed data to image data;
(3) image synthesizing processing (which enables image data from a plurality of units to be synthesized, and further, includes synthesizing the image data on a data bus);
(4) image shifting processing (which enables an image to be shifted in main and sub scanning directions);
(5) image region expanding processing (which enables an image region to be magnified to the periphery by an arbitrary amount);
(6) image scaling processing (to, for example, a fixed scale of 50% or 200%);
(7) parallel bus interface processing;
(8) serial bus interface processing (with a process controller 211, described later);
(9) format converting processing between parallel data and serial data;
(10) interface processing with the image reading unit 101;
(11) interface processing with the image processing unit 103; and
(12) data decompressing processing.

The image reading unit 101 undertakes, for example, following processing:

(1) processing of reading light reflected on an original by means of an optical system;
(2) processing of converting the light into an electric signal in a CCD (a charge coupled device);
(3) digitizing processing by means of an A/D (analog-to-digital) converter;
(4) shading correcting processing (processing of correcting unevenness of illumination distribution of a light source); and (5) scanner γ correcting processing (processing of correcting the concentration characteristics of a reading system).

The image memory control unit 102 undertakes, for example, following processing:
(1) interface control processing with a system controller;
(2) parallel bus control processing (processing of controlling an interface with a parallel bus);
(3) network control processing;
(4) serial bus control processing (processing of controlling a plurality of outside serial ports);
(5) inside bus interface control processing (processing of controlling a command with respect to an operating unit);
(6) local bus control processing (processing of controlling accesses of the ROM, the RAM and font data for booting the system controller);
(7) processing of controlling operation of a memory module (processing of controlling a writing/reading operation of a memory module);
(8) memory module access control processing (processing of conciliating requests for a memory access from a plurality of units);
(9) obverse and reverse image data compressing/decompressing processing (processing of reducing the amount of data for the purpose of memory effective use);
(10) image editing processing (processing of clearing data in a memory region, turning the image data, synthesizing images on a memory, and the like); and
(11) processing of controlling inputting of obverse and reverse image data to be input from a reading unit.

The image processing unit 103 undertakes, for example, following processing:
(1) shading correcting processing (processing of correcting unevenness of illumination distribution of a light source);
(2) scanner γ correcting processing (processing of correcting the concentration characteristics of a reading system);
(3) MTF correcting processing;
(4) smoothing processing;
(5) arbitrarily scaling processing in a main scanning direction;
(6) concentration varying processing (γ varying processing: a concentration notch);
(7) simple multi-level processing;
(8) simple binary processing;
(9) error diffusing processing;
(10) dithering processing;
(11) dot arrangement phase control processing (processing of arranging dots rightward or leftward);
(12) isolated point eliminating processing;
(13) image region separating processing (color judgment, attribute judgment or adaptation); and
(14) density varying processing.

The image writing unit 104 undertakes, for example, following processing:
(1) edge trimming processing (shagginess correcting processing);
(2) dot re-arrangement correcting processing;
(3) processing of controlling a pulse of an image signal; and
(4) processing of converting a format of parallel data or serial data.

Next, hardware configuration in which the image processing apparatus 105 in the present embodiment constitutes a digital combined machine will be explained.

Figure 2:
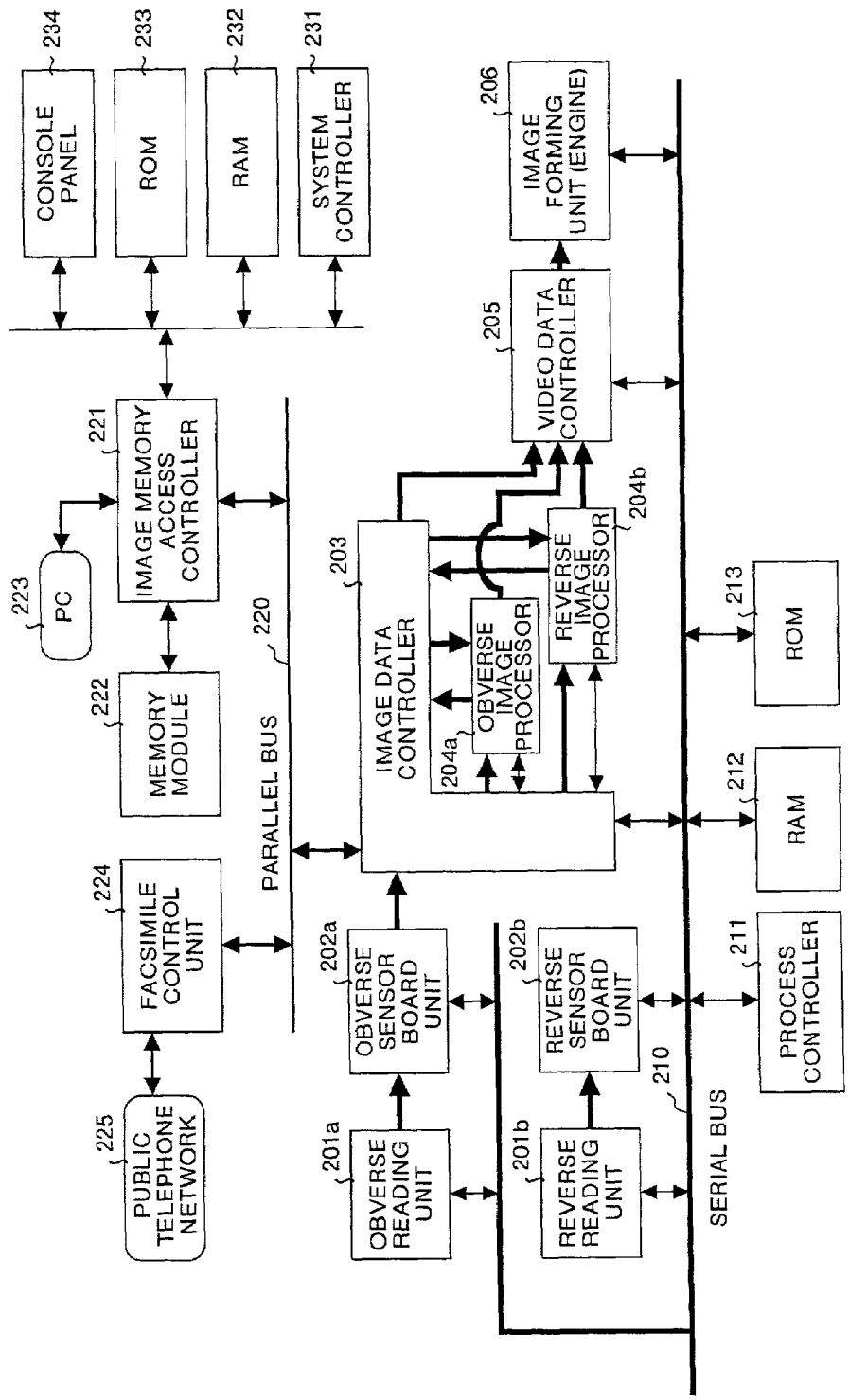
FIG. 2 is a block diagram illustrating one example of the hardware configuration of the image processing apparatus in the first embodiment.

FIG. 2 is a block diagram illustrating one example of the hardware configuration of the image processing apparatus in the present embodiment. Hereinafter, an alphabet a is attached to components for processing the obverse image data; another alphabet b is attached to components for processing the reverse image data; and no alphabet is attached when components are generically called.

In the block diagram illustrated in FIG. 2, the image processing apparatus in the present embodiment comprises an obverse reading unit 201a, a reverse reading unit 201b, an obverse sensor board unit 202a, a reverse sensor board unit 202b, an image data controller 203, an obverse image processor 204a, a reverse image processor 204b, a video data controller 205 and an image forming unit (engine) 206. The image processing apparatus in the present embodiment further comprises a process controller 211, a RAM 212 and a ROM 213 via a serial bus 210.

Moreover, the image processing apparatus in the present embodiment comprises an image memory access controller 221 and a facsimile control unit 224 via a parallel bus 220, and a memory module 222, a system controller 231, a RAM 232, a ROM 233 and a console panel 234, all of which are connected to the image memory access controller 221.

The correlation between the above-mentioned constituent elements and the units 100 to 104 illustrated in FIG. 1 will be explained. Namely, the reading unit 201 and the sensor board unit 202 fulfill the function of the image reading unit 101 illustrated in FIG. 1. In the same manner, the image data controller 203 serves the function of the image data controller unit 100. Furthermore, in the same manner, the image processor 204 carries out the function of the image processing unit 103.

Moreover, in the same manner, the video data controller 205 and the image forming unit (engine) 206 fulfill the function of the image writing unit 104. Additionally, in the same manner, the image memory access controller 221 and the memory module 222 serve the function of the image memory control unit 102.

Next, the contents of the constituent elements will be explained. The reading unit 201 for optically reading an original is constituted of a lamp, mirrors and lenses, in which light reflected on the original with irradiation by the lamp is focused on a light receiving element by the mirrors and the lenses. In the present embodiment, the image data are obtained from the obverse and reverse of the document, and therefore, the lamps, the mirrors and the light receiving elements are required in twos.

The light receiving element, for example, a CCD, is mounted on the sensor board unit 202. Image data converted into an electric signal by the CCD is further converted into a digital signal, to be then output (transmitted) from the sensor board unit 202.

The image data output (transmitted) from the sensor board unit 202 is input into (received by) the image data controller 203. All the transmission of the image data between the functional devices (the processing units) and the data buses is controlled by the image data controller 203.

The image data controller 203 transfers the image data to the sensor board unit 202, the parallel bus 220 and the image processor 204, and transmits the image data to the process controller 211 and the system controller 231 which manages the entire control of the image processing apparatus. Moreover, the RAM 212 is used as a work area of the process controller 211, and the ROM 213 stores therein a boot program for the process controller 211, and the like.

The image data output (transmitted) from the sensor board unit 202 is compressed with respect to the obverse or reverse, as required, to be thus transferred (transmitted) to the image processor 204 via the image data controller 203, and thereafter, deterioration of the signal associated with quantization to the optical system and a digital signal (i.e., deterioration of the signal in the scanner system) is corrected, thereby outputting (transmitting) the image data to the image data controller 203 again.

The image memory access controller 221 controls writing/reading of the image data in/from the memory module 222. Furthermore, the image memory access controller 221 controls the operation of each of the constituent elements connected to the parallel bus 220. Moreover, the RAM 232 is used as a work area of the system controller 231. The ROM 233 stores therein the boot program and the like for the system controller 231.

The console panel 234 inputs the processing to be performed by the image processing apparatus 105: for example, the kind of processing (copying, facsimile transmission, image reading, printing or the like), the number of sheets to be processed or the like. Consequently, it is possible to input image data control information. Incidentally, the content of the facsimile control unit 224 will be described later.

Subsequently, there are a job for accumulating the read image data in the memory module 222 for reuse and a job for not accumulating the read image data in the memory module 222. Now, each of the jobs will be explained below. As an example of the job for accumulating the read image data in the memory module 222, there is a method in which when a single original is copied onto a plurality of sheets, the reading unit 201 is operated only once, and then, the image data read by the reading unit 201 is accumulated in the memory module 222, and therefore, the accumulated image data is read out a plurality of times.

In contrast, as an example of the job for not accumulating the read image data in the memory module 222, when a single original is copied onto only one sheet, the read image data is simply reproduced as it is, and consequently, no access is required to the memory module 222 by the image memory access controller 221.

First of all, when the memory module 222 is not used, the data transferred from the image processor 204 to the image data controller 203 is returned again to the image processor 204 from the image data controller 203. The image processor 204 performs image quality processing for converting luminance data obtained by the CCD in the sensor board unit 202 into an area gradation.

The image data after the image quality processing is transferred from the image processor 204 to the video data controller 205. The signal, which has been converted into the area gradation, is subjected to post-processing relating to dot arrangement and pulse control for reproducing dots, and thereafter, a reproduced image is formed on a transfer sheet in the image forming unit 206.

Subsequently, flow of the image data when additional processing, for example, a turn in an image direction, synthesis of images or the like is performed in reading the image accumulated in the memory module 222 will be explained. The image data transferred to the image data controller 203 from the image processor 204 is transmitted to the image memory access controller 221 from the image data controller 203 via the parallel bus 220.

The image memory access controller 221 performs access control of the image data by the memory module 222, development of printing data in an outside personal computer (PC) 223, and compression/decompression of the image data for effective use of the memory module 222 based on the control of the system controller 231.

The image data transmitted to the image memory access controller 221 is accumulated in the memory module 222 after data compression, and the accumulated image data is read, as required. The read image data is decompressed to the original image data, and then, is returned to the image data controller 203 from the image memory access controller 221 via the parallel bus 220.

After the transmission from the image data controller 203 to the image processor 204, the image quality processing and the pulse control in the video data controller 205 are performed, thereby forming a reproduced image on a transfer sheet in the image forming unit 206.

In the flow of the image data, the function of the digital combined machine can be served under the bus control in the parallel bus 220 and the image data controller 203. In order to exhibit the facsimile transmission function, the read image data is subjected to the image processing in the image processor 204, and then, is transferred to the facsimile control unit 224 via the image data controller 203 and the parallel bus 220. The facsimile control unit 224 performs data conversion with respect to a communication network, and then, transmits the data as facsimile data to a public network (PN) 225.

In the meantime, as to the received facsimile data, network data from the public network (PN) 225 is converted into image data in the facsimile control unit 224, and then, is transferred to the image processor 204 via the parallel bus 220 and the image data controller 203. In this case, dot rearrangement and the pulse control are performed in the video data controller 205, and thereafter, a reproduced image is formed on a transfer sheet in the image forming unit 206.

When the plurality of jobs, for example, the copying function, the facsimile transmitting/receiving function, the printer outputting function and the like are performed simultaneously, the assignment of the using priority of the image forming unit 206 and parallel bus 220 to the jobs is controlled by the system controller 231 and the process controller 211.

The process controller 211 controls the flow of the image data; in contrast, the system controller 231 controls the entire system and manages the booting of resources. Furthermore, the functions of the digital combined machine are selectively input in the console panel (the operating unit) 234, and thus, the processing content of the copying function, the facsimile function or the like is set.

The system controller 231 and the process controller 211 communicate with each other via the parallel bus 220, the image data controller 203 and the serial bus 210. Specifically, the system controller 231 and the process controller 211 communicate with each other by converting a data format for a data interface between the parallel bus 220 and the serial bus 210 inside the image data controller 203.

Figure 3:
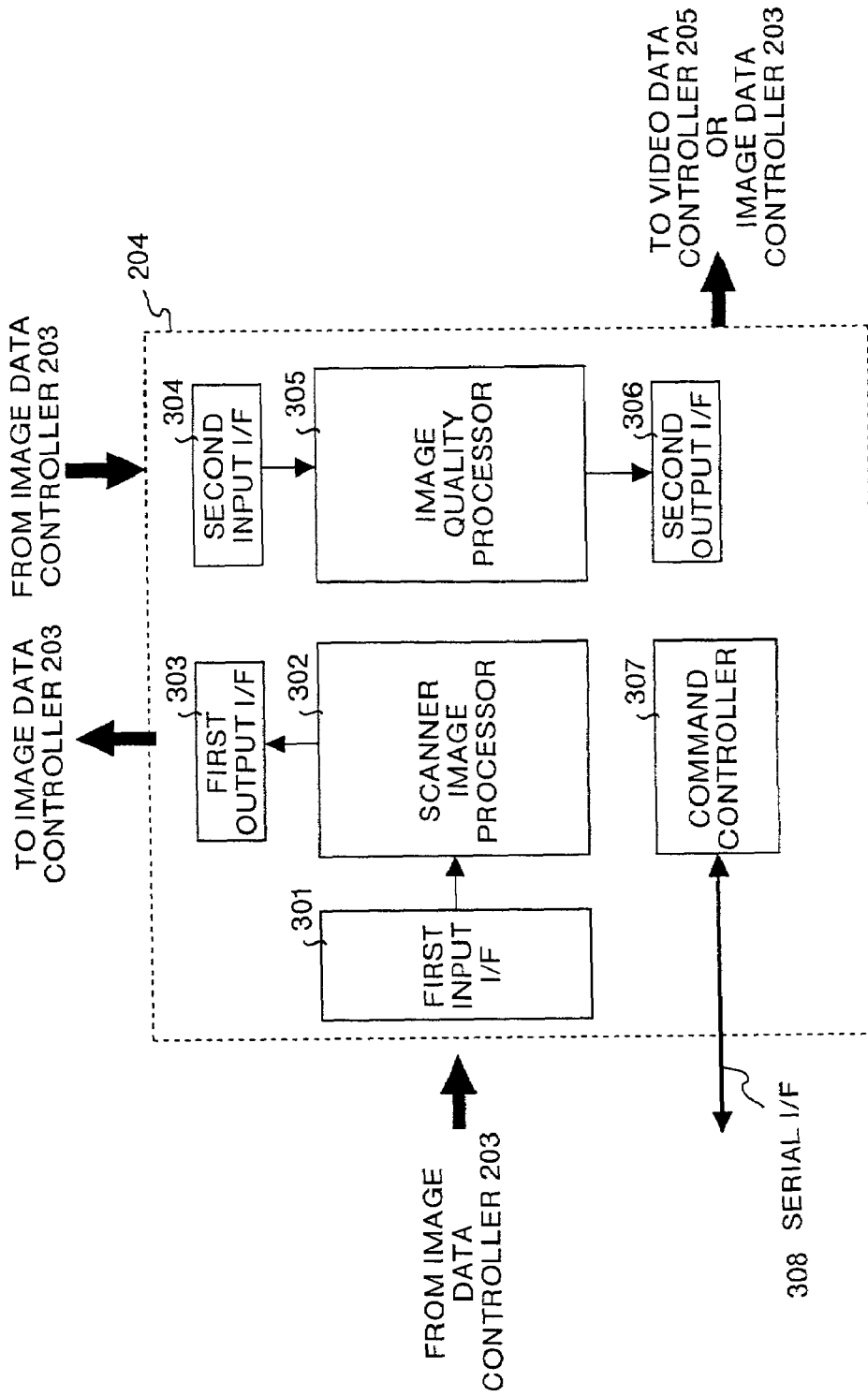
FIG. 3 is a block diagram illustrating the outline of processing in an image processor in the image processing apparatus in the first embodiment.

Next, an outline of the processing in the image processor 204 constituting the image processing unit 103 will be explained. FIG. 3 is a block diagram illustrating the outline of the processing in the image processor 204 in the image processing apparatus in the present embodiment.

Although the image processor 204 includes an obverse image processor 204a for processing obverse image data and a reverse image processor 204b for processing reverse image data, an explanation will be given without specifically distinguishing the obverse image processor 204a and the reverse image processor 204b from each other.

In the block diagram of FIG. 3, the image processor 204 includes a first input interface (I/F) 301, a scanner image processor 302, a first output I/F 303, a second input I/F 304, an image quality processor 305 and a second output I/F 306.

In the above-mentioned configuration, read image data is transmitted from the first input I/F 301 to the scanner image processor 302 in the image processor 204 via the sensor board unit 202 and the image data controller 203.

The scanner image processor 302 is directed to correct the deterioration of the read image data: specifically, shading correction, scanner γ correction, MTF correction and the like. Furthermore, the scanner image processor 302 can perform scaling processing of enlargement/reduction, although not the correction processing in the strict sense. Upon completion of the correction processing of the read image data, the image data is transferred to the image data controller 203 via the first output interface 303.

In outputting the image data to a transfer sheet, the image data from the image data controller 203 is received in the second input I/F 304, and then, is subjected to the area gradation processing in the image quality processor 305. The image data after the image quality processing is output to the video data controller 205 or the image data controller 203 via the second output I/F 306.

The area gradation processing in the image quality processor 305 includes mainly area approximation of gradation information such as density converting processing, dither processing and error diffusing processing. Once the image data processed in the scanner image processor 302 is accumulated in the memory module 222, various reproduced images can be confirmed by changing the image quality processing in the image quality processor 305.

For example, the tone of the reproduced image can be easily varied by assigning (varying) the density of the reproduced image or varying the number of lines of dither matrices. At this time, it is unnecessary to read the image from the reading unit 201 every time the processing is varied. The same image data can be speedily subjected to different processing any time by reading the accumulated image data from the memory module 222.

Figure 4:
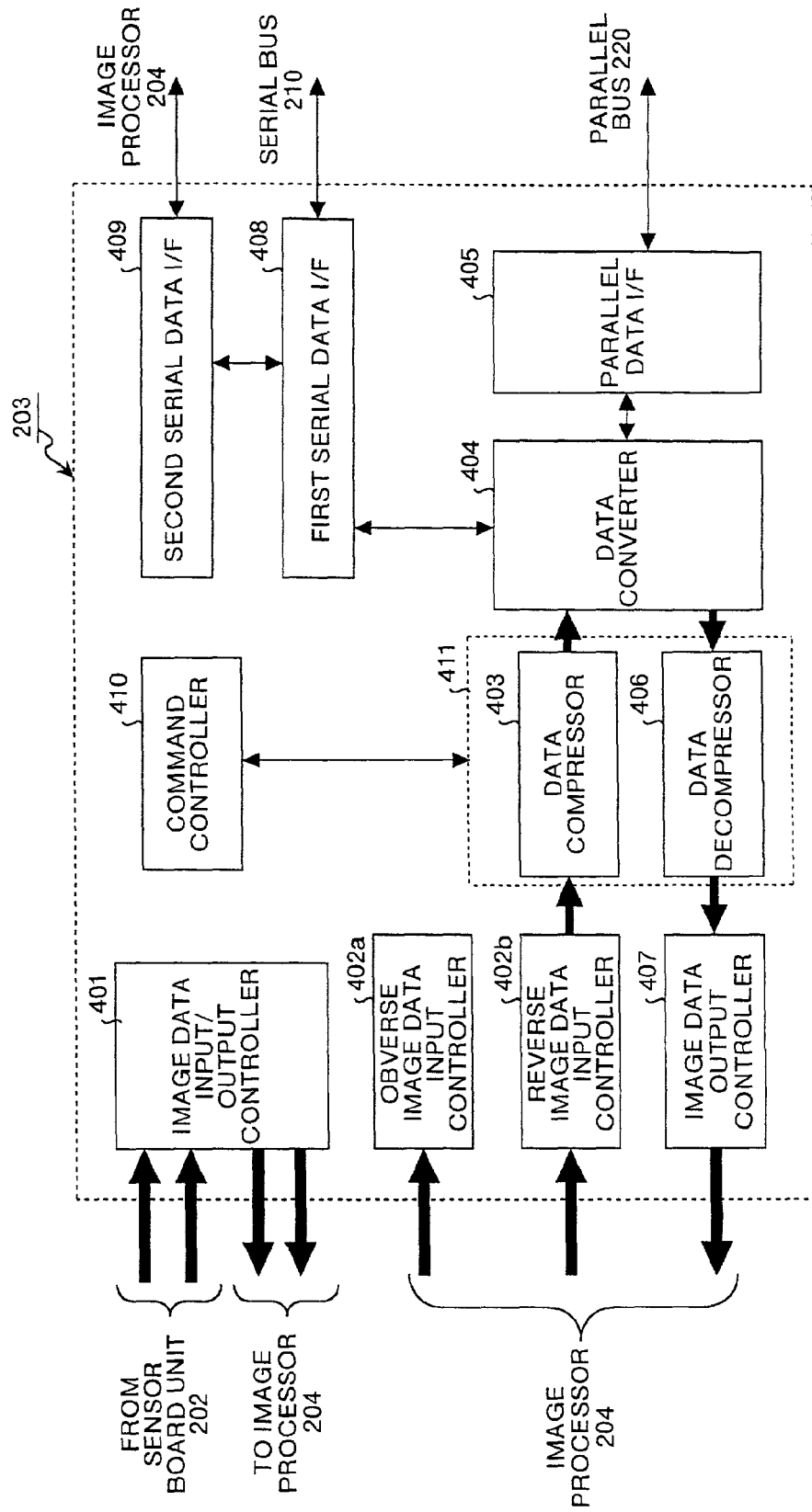
FIG. 4 is a block diagram illustrating the outline of the processing in an image data controller in the image processing apparatus in the first embodiment.

Next, an outline of the processing in the image data controller 203 constituting the image data control unit 100 will be explained. FIG. 4 is a block diagram illustrating the outline of the processing in the image data controller 203 in the image processing apparatus in the present embodiment.

As illustrated in the block diagram of FIG. 4, an image data input/output controller 401 inputs (receives) the image data from the sensor board unit 202, and then, outputs (transmits) the image data to the image processor 204. That is, the image data input/output controller 401 is a constituent element for connecting the image reading unit 101 and the image processing unit 103 (the image processor 204) to each other, or an input/output port exclusive for merely transmitting the image data read by the image reading unit 101 to the image processing unit 103.

Furthermore, an obverse image data input controller 402a inputs the image data, which has undergone scanner image correction in the obverse image processor 204a. The input image data is subjected to data compressing processing in a data compressor 403. Thereafter, the image data is sent to the parallel bus 220 through a parallel data I/F 405 via a data converter 404.

In a similar manner, a reverse image data input controller 402b inputs the image data, which has undergone scanner image correction in the reverse image processor 204b. The input image data is subjected to data compressing processing in the data compressor 403. Thereafter, the image data is sent to the parallel bus 220 through the parallel data I/F 405 via the data converter 404. The configuration and operation of the data compressor 403 will be described later in detail.

Since the image data input from the parallel bus 220 via the parallel data I/F 405 is compressed for the purpose of the bus transfer, the image data is sent to a data decompressor 406 via the data converter 404, to be thus subjected to data decompressing processing. The decompressed image data is transferred to the image processor 204 in an image data output controller 407.

Moreover, the image data controller 203 is also equipped with the function of converting parallel data into serial data, and vice versa. The system controller 231 transfers the data to the parallel bus 220; in the meantime, the process controller 211 transfers the data to the serial bus 210. Therefore, the image data controller 203 converts the data for the purpose of the communications between the two controllers.

Additionally, a serial data I/F unit includes a first serial data I/F 408 for transmitting or receiving the data to or from the process controller via the serial bus 210 and a second serial data I/F 409 for use in transmitting or receiving the data to or from the image processor 204. Since one system is independently provided with respect to the image processor 204, it is possible to smoothen an interface with the image processor 204.

Furthermore, a command controller 410 controls the operations of the constituents and interfaces inside the above-described image data controller 203 in accordance with an input command. The command controller 410 controls the operation of, in particular, a data compressing/decompressing unit 411 including the data compressor 403 and the data decompressor 406. The control will be described later in detail.

Figure 5:
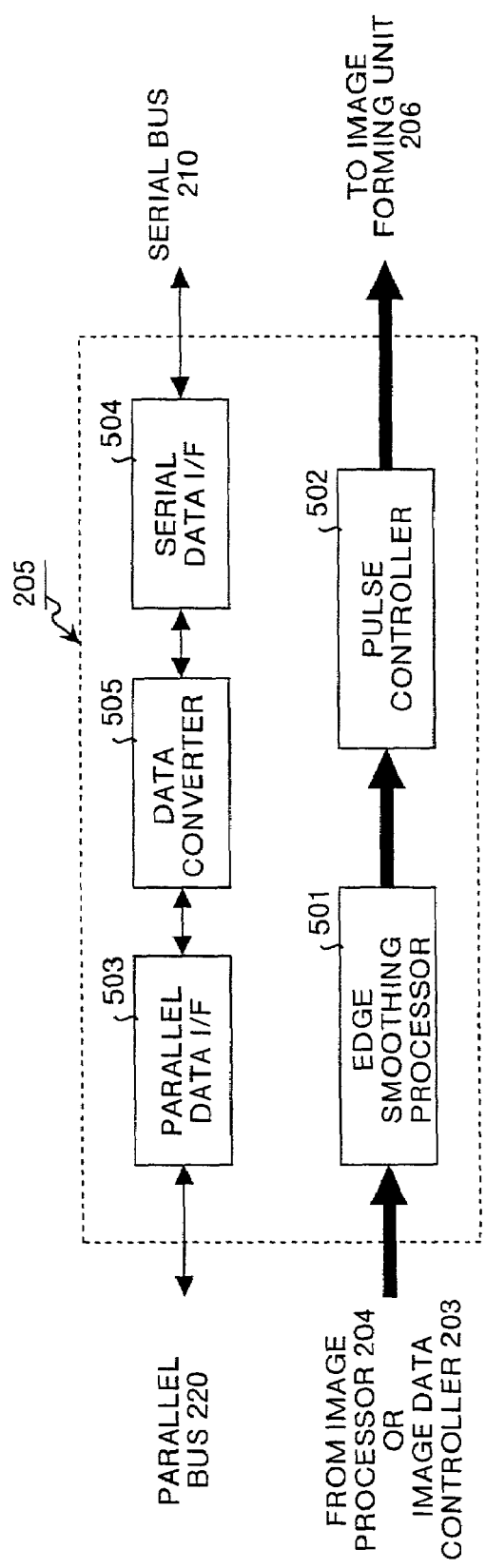
FIG. 5 is a block diagram illustrating the outline of the processing in a video data controller in the image processing apparatus in the first embodiment.

Next, an outline of the processing in the video data controller 205 constituting a part of the image writing unit 104 will be explained. FIG. 5 is a block diagram illustrating the outline of the processing in the video data controller 205 in the image processing apparatus in the present embodiment.

As illustrated in the block diagram of FIG. 5, the video data controller 205 subjects the image data to be input to additional processing depending upon the characteristics of the image forming unit 206. Namely, an edge trimming processor 501 rearranges dots by edge trimming processing. A pulse controller 502 controls a pulse of an image signal for the purpose of dot formation. The image data through the above-described processing is output to the image forming unit 206.

Besides the image data conversion, since the video data controller 205 is equipped with the format converting function for parallel data and serial data, the video data controller 205 even as a discrete unit can cope with the communications between the system controller 231 and the process controller 211. That is, a parallel data I/F 503 for transmitting or receiving the parallel data, a serial data I/F 504 for transmitting or receiving the serial data and a data converter 505 for mutually converting the data received by the parallel data I/F 503 and the data received by the serial data I/F 504. Consequently, it is possible to convert the format of the parallel data into the format of the serial data, and vice versa.

Figure 6:
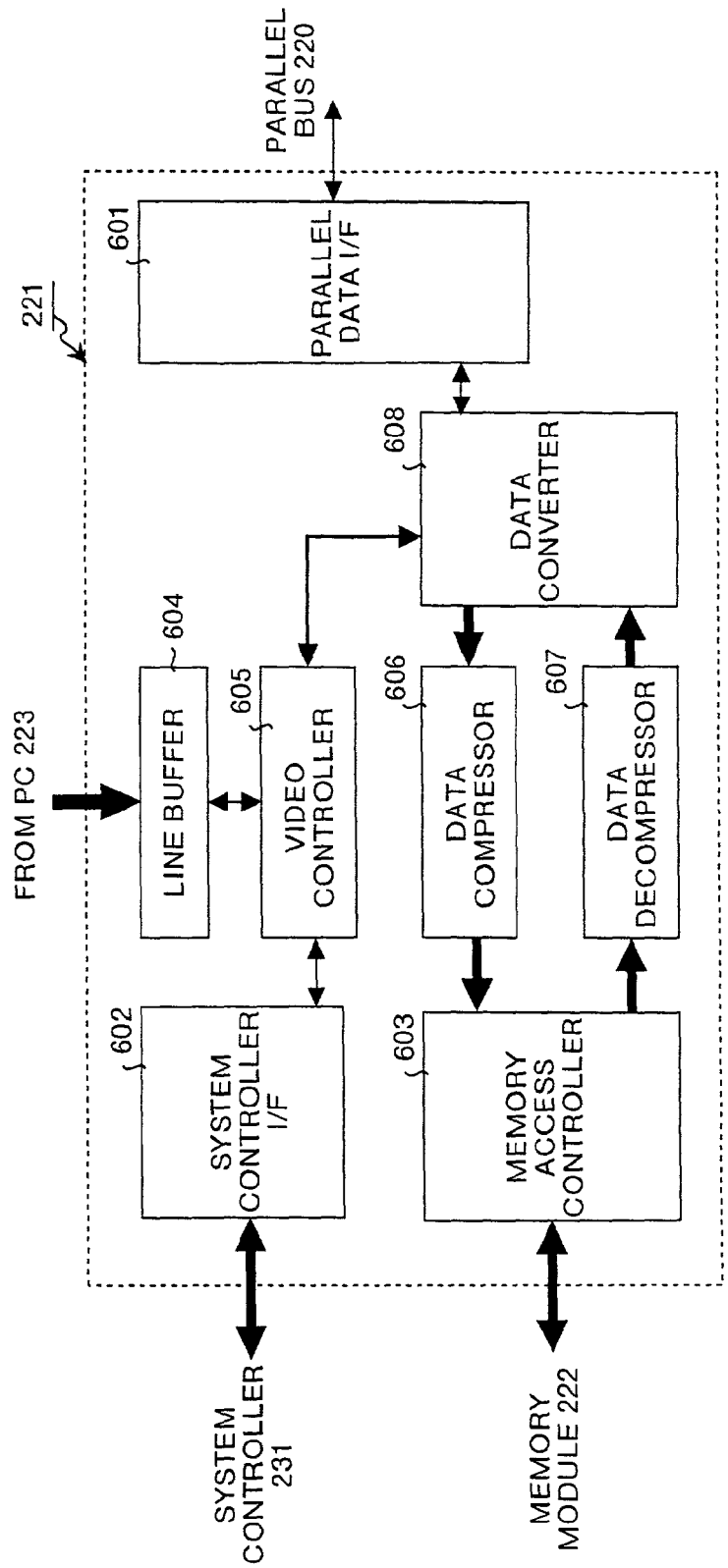
FIG. 6 is a block diagram illustrating the outline of the processing in an image memory access controller 221 in the image processing apparatus in the first embodiment.

Next, an outline of the processing in the image memory access controller 221 constituting apart of the image memory control unit 102 will be explained. FIG. 6 is a block diagram illustrating the outline of the processing in the image memory access controller 221 in the image processing apparatus in the present embodiment.

As illustrated in the block diagram of FIG. 6, the image memory access controller 221 manages the parallel bus 220 and the interface of the image data, controls an access, i.e., storing (writing)/reading of the image data in the memory module 222, and further, controls development of code data to be input from mainly the outside PC 223 to the image data.

Therefore, the image memory access controller 221 includes a parallel data I/F 601, a system controller I/F 602, a memory access controller 603, a line buffer 604, a video controller 605, a data compressor 606, a data decompressor 607 and a data converter 608.

Here, the parallel data I/F 601 manages an interface of the image data with the parallel bus 220. Furthermore, the memory access controller 603 controls an access, i.e., storing (writing)/reading of the image data in the memory module 222.

As to the input code data, the data is stored in a local region in the line buffer 604. The code data stored in the line buffer 604 is developed to image data in the video controller 605 in accordance with a development processing command input from the system controller 231 via the system controller I/F 602.

The developed image data or the image data input from the parallel bus 220 via the parallel data I/F 601 is stored in the memory module 222. In this case, the image data to be stored is selected in the data converter 608, to be thus compressed in the data compressor 606 in order to enhance memory using efficiency, and then, the image data is stored (written) in the memory module 222 while an address of the memory module 222 is managed in the memory access controller 603.

The image data stored (accumulated) in the memory module 222 is read by controlling an address to be read in the memory access controller 603. The read image data is decompressed in the data decompressor 607. In the case where the decompressed image data is transferred to the parallel bus 220, the data is transferred via the parallel data I/F 601.

Figure 7:
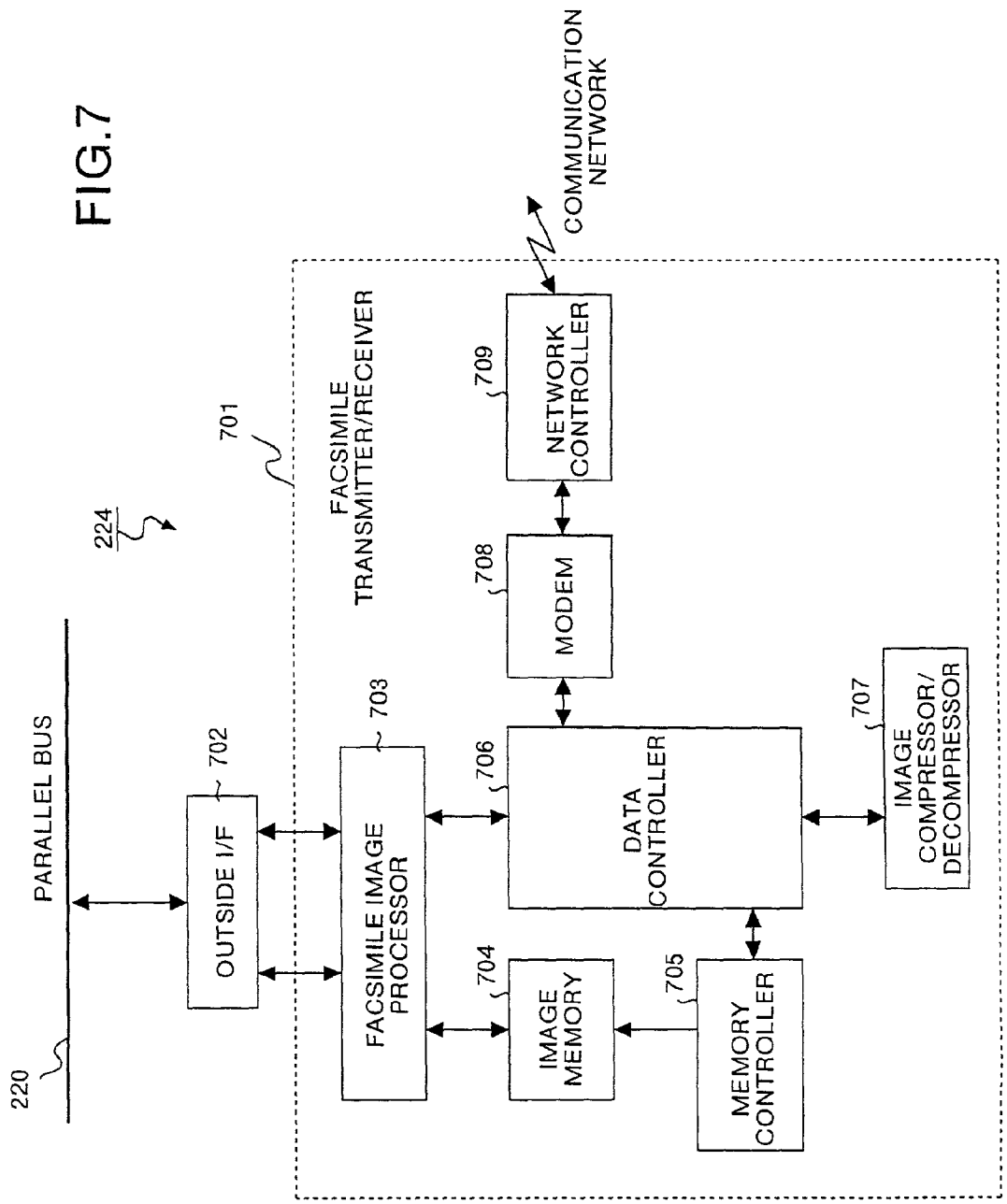
FIG. 7 is a block diagram illustrating the configuration of a facsimile control unit in the image processing apparatus in the first embodiment.

Next, functional configuration of the facsimile control unit 224 will be explained. FIG. 7 is a block diagram illustrating the configuration of the facsimile control unit 224 in the image processing apparatus in the present embodiment.

As illustrated in the block diagram of FIG. 7, the facsimile control unit 224 comprises a facsimile transmitter/receiver 701 and an outside I/F 702. Here, the facsimile transmitter/receiver 701 converts image data into a format for the communications, so as to transmit it to an outside network; in contrast, the facsimile transmitter/receiver 701 converts data from the outside into image data so as to record and output it in the image forming unit via the outside I/F 702 and the parallel bus 220.

The facsimile transmitter/receiver 701 includes a facsimile image processor 703, an image memory 704, a memory controller 705, a data controller 706, an image compressor/decompressor 707, a modem 708 and a network controller 709.

In the facsimile image processor 703, binary smoothing processing with respect to a received image is performed in the edge trimming processing 501 inside the video data controller 205 illustrated in FIG. 5. In the image memory 704, a part of an output buffer function is shifted to the image memory access controller 221 and the memory module 222.

In the facsimile transmitter/receiver 701 such configured as described above, the data controller 706 instructs the memory controller 705 in starting the transfer of the image data, and thus, allows the memory controller 705 to read the accumulated image data from the image memory 704 in sequence. The read image data is restored into an original signal by the facsimile image processor 703, followed by density changing processing and scaling processing, to be input into the data controller 706.

The image data input into the data controller 706 is encoded and compressed by the image compressor/decompressor 707, is modulated by the modem 708, and then, is sent to a destination via the network controller 709. The image information which has been already transmitted is erased from the image memory 704.

At the time of reception, a received image is accumulated once in the image memory 704. At this time, if the received image can be recorded and output, the image is recorded and output at the timing of completion of the reception of the image by an amount of one sheet. Otherwise, when the facsimile transmitter/receiver 701 is called during a copying operation to start the reception, the received image is accumulated in the image memory 704 until a using ratio of the image memory 704 reaches a predetermined value, for example, 80%. When the using ratio of the image memory 704 reaches 80%, the writing operation performed at that time is forcibly interrupted, so that the received image is read out of the image memory 704 to be thus recorded and output.

At this time, the received image read out of the image memory 704 is erased from the image memory 704. The interrupted writing operation is resumed at the time when the using ratio of the image memory 704 is decreased down to, e.g., 10%. Upon completion of the entire writing operation, the remaining received image is recorded and output. Moreover, in order to resume the writing operation after the interruption, various parameters for the writing operation during the interruption are internally saved. At the time of resuming the writing operation, the parameters are internally restored.

Figure 8:
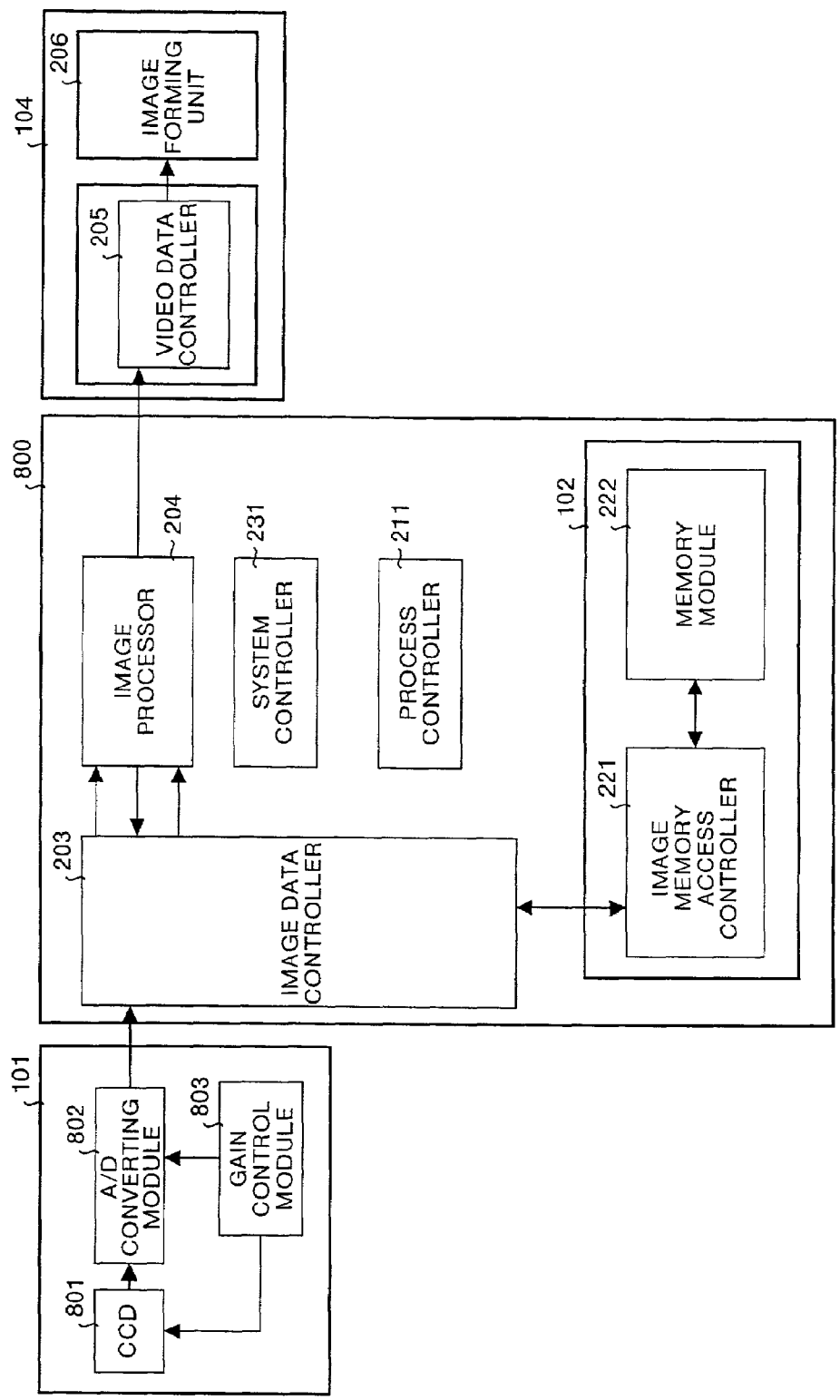
FIG. 8 is a block diagram illustrating one example of unit configuration when the image processing apparatus is a digital combined machine.

Next, unit configuration of the image processing apparatus in the present embodiment will be explained. FIG. 8 is a block diagram illustrating one example of the unit configuration when the image processing apparatus is a digital combined machine.

As illustrated in FIG. 8, in case of the digital combined machine, the image processing apparatus comprises three units: the image reading unit 101, an image engine control unit 800 and the image writing unit 104, each of the three units being managed on an independent PCB substrate.

The image reading unit 101 consists of a CCD 801, an A/D converting module 802 and a gain control module 803, for converting optical image information, which has been optically read, into a digital image signal.

The image engine control unit 800 consists of mainly the system controller 231, the process controller 211 and the memory module 222 contained inside the image memory control unit 102, wherein the image processor 204, the image memory access controller 221 and the image data controller 203 in charge of the bus control are managed as a single unit.

Furthermore, the image writing unit 104 consists of mainly the video data controller 205, and includes the image forming unit 206.

In the above-described unit configuration, when the specifications and performance of the image reading unit 101 are modified, it is sufficient that only the image reading unit 101 is modified in the system of the digital combined machine, thereby making it unnecessary to modify the other units since the data interfaces are held. Moreover, when the image forming unit (engine) 206 is modified, the system can be reconstructed by modifying only the image writing unit 104.

In this manner, since the units dependent on the input/output devices construct the system with the independent configurations, the system can be graded up by only replacing the minimum unit as long as the data interfaces are held.

In the configuration of the image engine control unit 800 illustrated in FIG. 8, the respective modules (the constituents) of the image processor 204, image data controller 203 and image memory access controller 221 are independent of each other. Consequently, the transfer from the image engine control unit 800 to the controller signifies the removal of an unnecessary module, and therefore, a common module is used for general-purpose use. In this manner, the similar function is fulfilled by using the common module without independently configuring the module for the image engine control and the module for the controller.

Subsequently, the image data compression performed by the image processing apparatus in the present embodiment will be explained. Although an explanation will be given below on the configuration and operation of the data compressor 403 inside the image data controller 203 (see FIG. 4), the data compressor 606 inside the image memory access controller 221 (see FIG. 6) or the image compressor/decompressor 707 inside the facsimile transmitter/receiver 701 may be configured in a similar manner according to a mode to be used.

Figure 9:
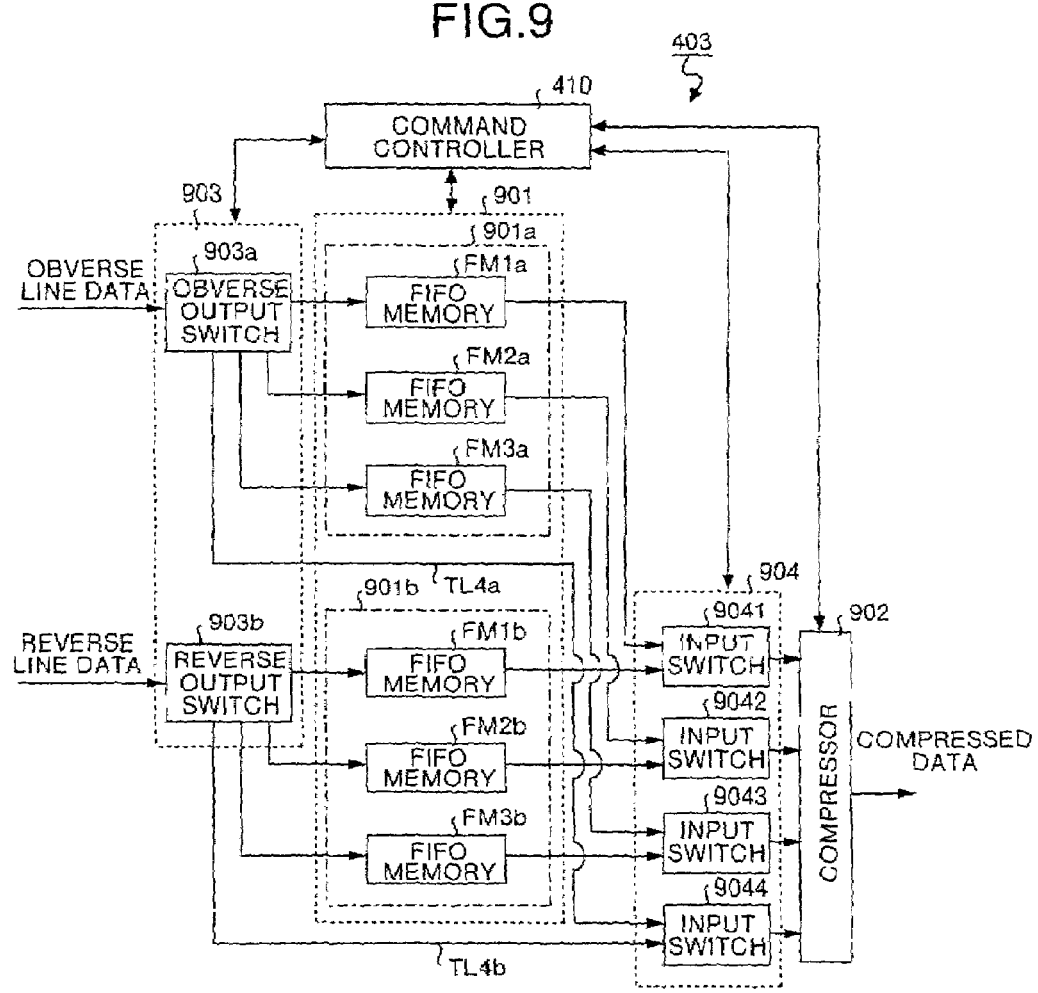
FIG. 9 is a block diagram illustrating the configuration of a data compressor in the image processing apparatus in the first embodiment.
Figure 10:
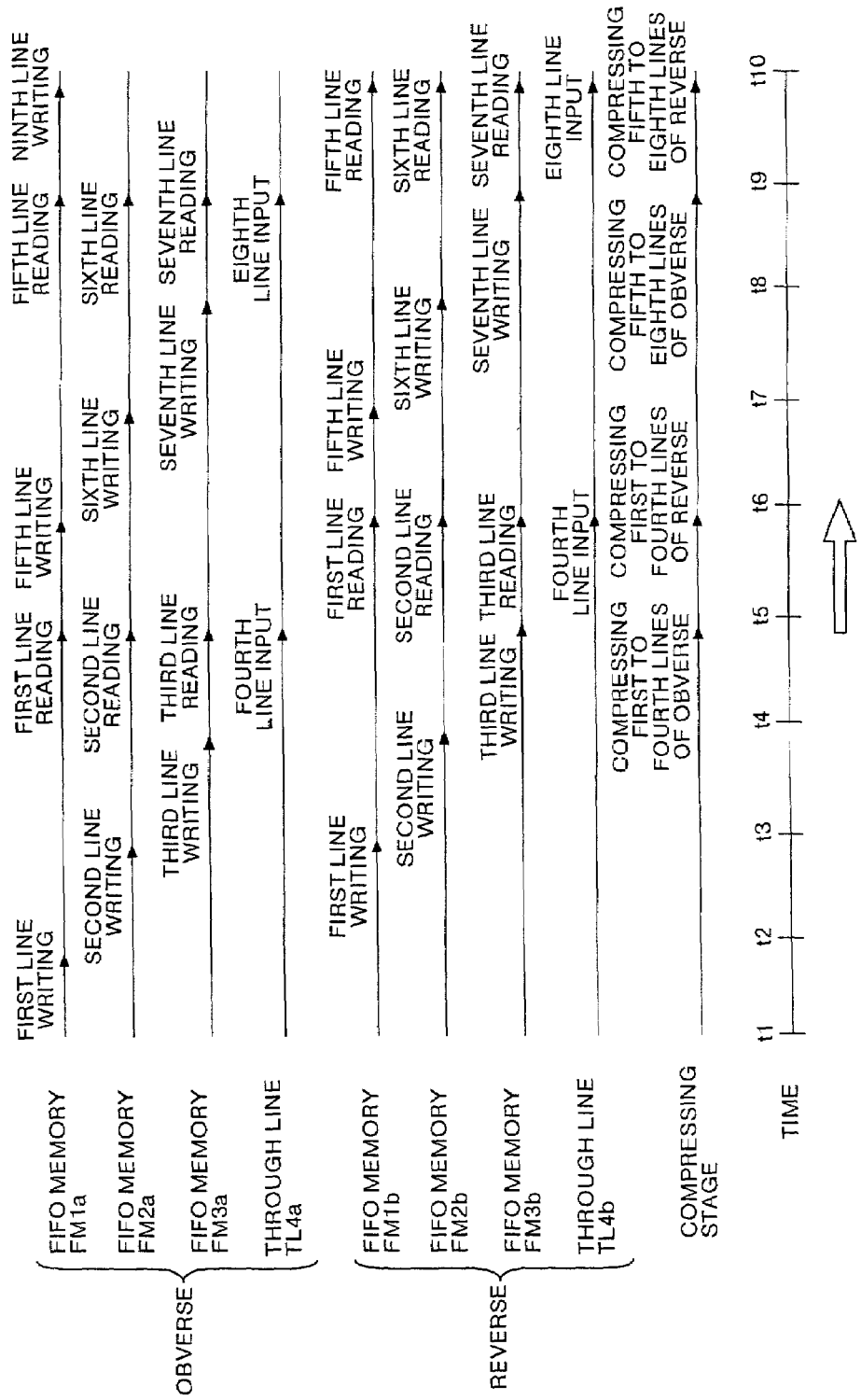
FIG. 10 is a timing chart illustrating the processing timings of the data compressor illustrated in FIG. 9.

First of all, configuration and operation of the data compressor 403 will be explained. FIG. 9 is a block diagram illustrating the configuration of the data compressor 403 in the image processing apparatus in the present embodiment; and FIG. 10 is a timing chart illustrating the processing timings of the data compressor 403.

In FIG. 9, the data compressor 403 comprises: a line memory group 901 for storing image data therein; a compressor 902 for compressing the image data; an output switch 903 for inputting the image data and switching its output destination; and an input switch group 904 for switching an input source in the line memory group 901 and connecting it to the compressor 902.

Furthermore, the line memory group 901 includes an obverse line memory group 901a consisting of a plurality of FIFO memories FM1a, FM2a and FM3a for storing obverse image data therein, and a reverse line memory group 901b consisting of a plurality of FIFO memories FM1b, FM2b and FM3b for storing reverse image data therein.

The output switch 903 includes an obverse output switch 903a for switching the output destination of the obverse image data, and a reverse output switch 903b for switching the output destination of the reverse image data. Out of the output switches 903a and 903b, the obverse output switch 903a switches the output destination of the input image data among the FIFO memories FM1a, FM2a and FM3a and a through line TL4a serving as a circuit for transmitting the image data directly to the compressor 902. In the same manner, the reverse output switch 903b switches the output destination of the input image data among the FIFO memories FM1b, FM2b and FM3b and a through line TL4b.

The input switch group 904 includes an input switch 9041 for switching the FIFO memories FM1a and FM1b, an input switch 9042 for switching the FIFO memories FM2a and FM2b, an input switch 9043 for switching the FIFO memories FM3a and FM3b, and an input switch 9044 for switching the through lines TL4a and TL4b. Here, the FIFO memory used in the line memory group 901 is a 1-port FIFO memory.

Figure 18:
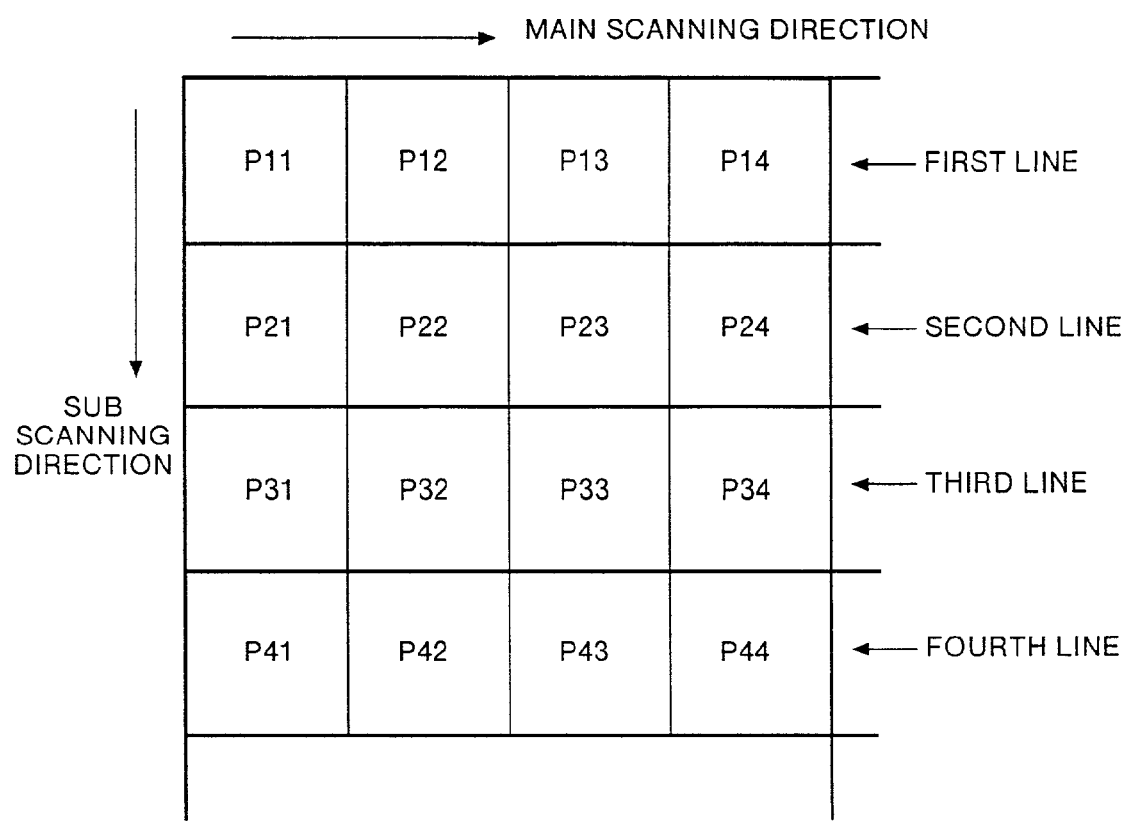
FIG. 18 illustrates one example of image data to be compressed by the data compressor.

Incidentally, for the sake of simple explanation, a region to be compressed by the compressor 902 is assumed to be a rectangular region consisting of four pixels per line multiplied by four lines, i.e., four pixels in the main scanning (pixel) direction and four lines in the sub scanning (line) direction, as illustrated in FIG. 18. According to a mode to be used, a region to be compressed by the compressor 902 may consist of eight pixels per line multiplied by eight lines in the DCT (Discrete Cosine Transformation) used in the MPEG (Motion Picture Expert Group) system in the motion compression standard. That is, the size of the region to be compressed depends upon hardware or application to be used, and therefore, it is not particularly limited to the size of four pixels per line multiplied by four lines.

First, how the obverse image data is compressed will be explained. As illustrated in FIG. 10, the obverse image data which has been output from the image processor 204 is first input via the obverse image data input controller 402a in compressing the image data. The image data are sequentially input into the obverse output switch 903a. The obverse output switch 903a transmits the image data consisting of first four pixels, for example, pixels P11, P12, P13 and P14 illustrated in FIG. 18 (image data on a first line of the obverse) to the FIFO memory FM1a.

When image data on a next pixel (i.e., a fifth pixel, or P21) is to be input, the obverse output switch 903a switches the output destination to the FIFO memory FM2a, and then, transmits image data consisting of four pixels including the above-described pixel (image data on a second line of the obverse) to the FIFO memory FM2a. In the same manner, when image data on a ninth pixel (P31) is to be input, the obverse output switch 903a switches the output destination to the FIFO memory FM3a, and then, transmits image data consisting of four pixels including the above-described pixel (image data on a third line of the obverse) to the FIFO memory FM3a.

When image data on a next 13th pixel (P41) is to be input, the obverse output switch 903a switches the output destination to the through line TL4, and then, transmits image data consisting of four pixels including the above-described pixel (image data on a fourth line of the obverse) directly to the compressor 902 via the input switch 9044. Simultaneously, the image data on the first to third lines of the obverse respectively stored in the FIFO memories FM1a to FM3a are read under the control of the command controller 410, and then, are transmitted to the compressor 902 via the input switches 9041, 9042 and 9043, respectively (see FIG. 10).

The compressor 902 receives the image data on the obverse of the first to third lines, and then, compresses them as a single unit. With the above-described operation, the image data consisting of the four pixels per line multiplied by the four lines can be compressed as a single unit. The compressed data is output to the image processor 204 under the control of the command controller 410.

In the meanwhile, when the image data on a 17th pixel is to be input, the obverse output switch 903a switches the output destination of the image data to the FIFO memory FM1a, and then, transmits image data on a fifth line to the FIFO memory FM1a. The obverse output switch 903a sequentially transmits image data on sixth and seventh lines to the FIFO memories FM2a and FM3a, respectively. The obverse output switch 903a transmits image data on an eighth line directly to the compressor 902 via the input switch 9044. Simultaneously, the obverse output switch 903a transmits the image data on the fifth, sixth and seventh lines of the obverse respectively stored in the FIFO memories FM1a, FM2a and FM3a to the compressor 902 via the input switches 9041, 9042 and 9043, respectively.

Hereinafter, the repetition of the similar control can achieve smooth compression of the obverse image data sequentially transmitted from the image processor 204. On the other hand, reverse image data also can be smoothly compressed in the same manner as the obverse image data. As described above, the command controller 410 controls the output switch 903, so that FIFO memories for the image data on the obverse and reverse can be saved by two lines in total, thereby reducing the size of the apparatus.

Furthermore, the data compressor 403 maybe configured in such a manner as to share the compressor 902. Such a configuration can be achieved by controlling the storing timing of the obverse and reverse image data to be transmitted to the FIFO memories. First, at a timing t1, the image data on the first line of the obverse is input. The obverse output switch 903*a* transmits the image data to the FIFO memory FM1*a* under the control of the command controller 410. The FIFO memory FM1*a* writes the transmitted obverse image data.

At a timing t2, the obverse output switch 903*a* transmits, to the FIFO memory FM2*a*, the image data on the second line of the obverse input in sequence. At this time, the reverse output switch 903*b* transmits the input image data on the first line of the reverse to the FIFO memory FM1*b*.

Namely, the image data on the obverse and the image data on the reverse are transmitted to the respective FIFO memories at the image data storing timings shifted by one line. An image data transmitting delay of one line can be generated by inserting a line memory equivalent to one FIFO memory in, for example, a front stage of the reverse output switch 903*b*.

At a timing t4, all of the input sources of the input switch group 904 are switched to the obverse line memory group 901*a* under the control of the command controller 410, and thus, the image data on the first to fourth lines of the obverse are transmitted to the compressor 902, which then compresses the image data on all of the four lines as a single unit.

In the same manner, since the reverse image data can be compressed as a single unit at a timing t5, the command controller 410 switches all of the input sources of the input switch group 904 to the reverse line memory group 901*b*, and thereafter, the image data on the first to fourth lines of the obverse are transmitted to the compressor 902, which then compresses the image data on all of the four lines as a single unit.

In this way, only one compressor can compress the obverse and reverse image data by shifting the input timing with respect to the compressor by one line, unlike in the prior art in which two compressors are required to compress the obverse and reverse image data. Furthermore, the provision of the input switch group 904 can halve the circuit configuration after the output stage of the input switch group 904. That is, both of the obverse and reverse can be read at a high speed in the reduced circuit size in the image processing apparatus in the present embodiment.

Incidentally, although the image processor 204 (see FIG. 2) includes the obverse image processor 204*a* and the reverse image processor 204*b* in the above-described embodiment, the image processor may be only one according to a mode to be used, for example, when the processing capacity of a section serving as the image processing unit 103 (see FIG. 1) is enhanced.

Figure 11:
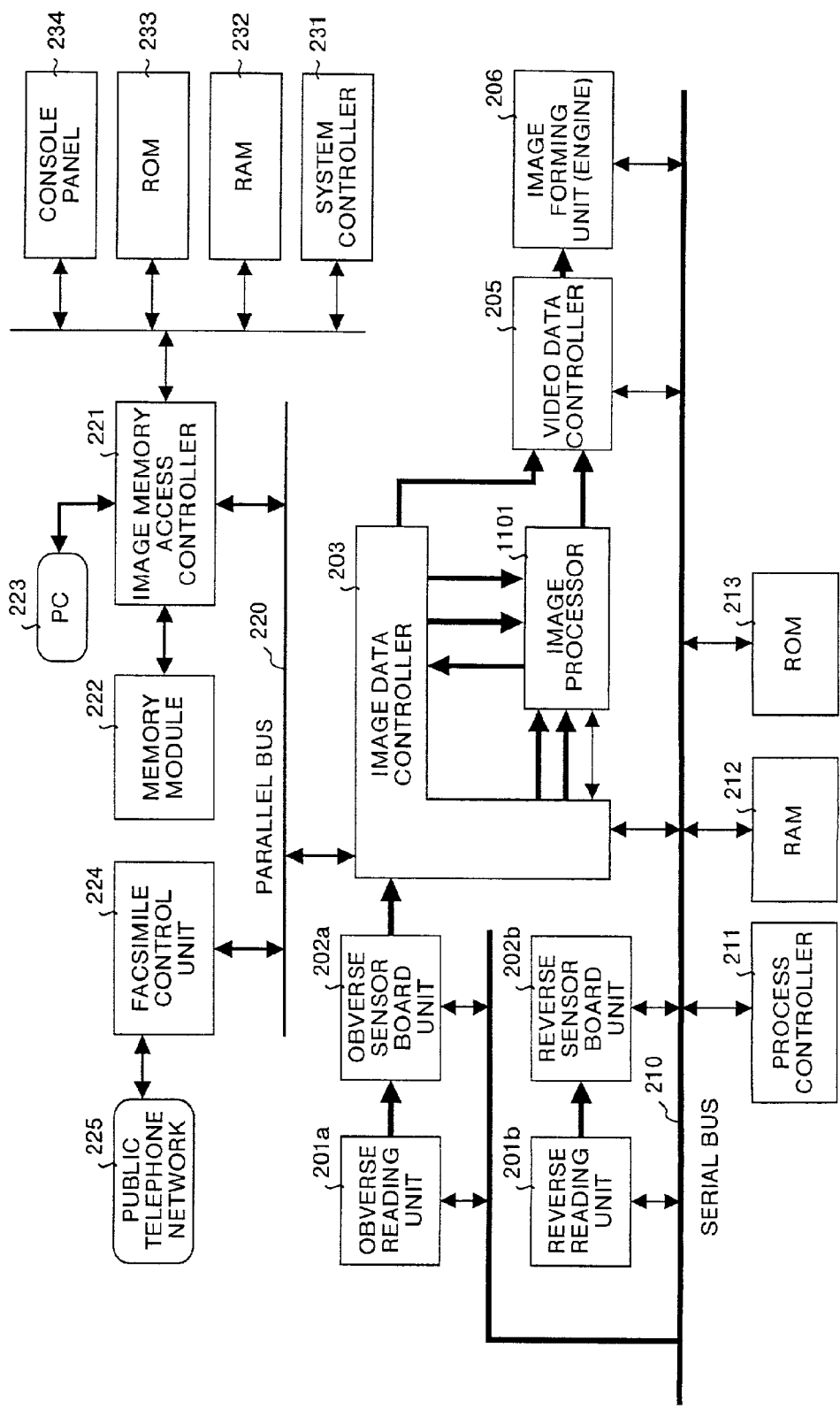
FIG. 11 is a block diagram illustrating another example of the configuration of the image processing apparatus when a single image processor is used.
Figure 12:
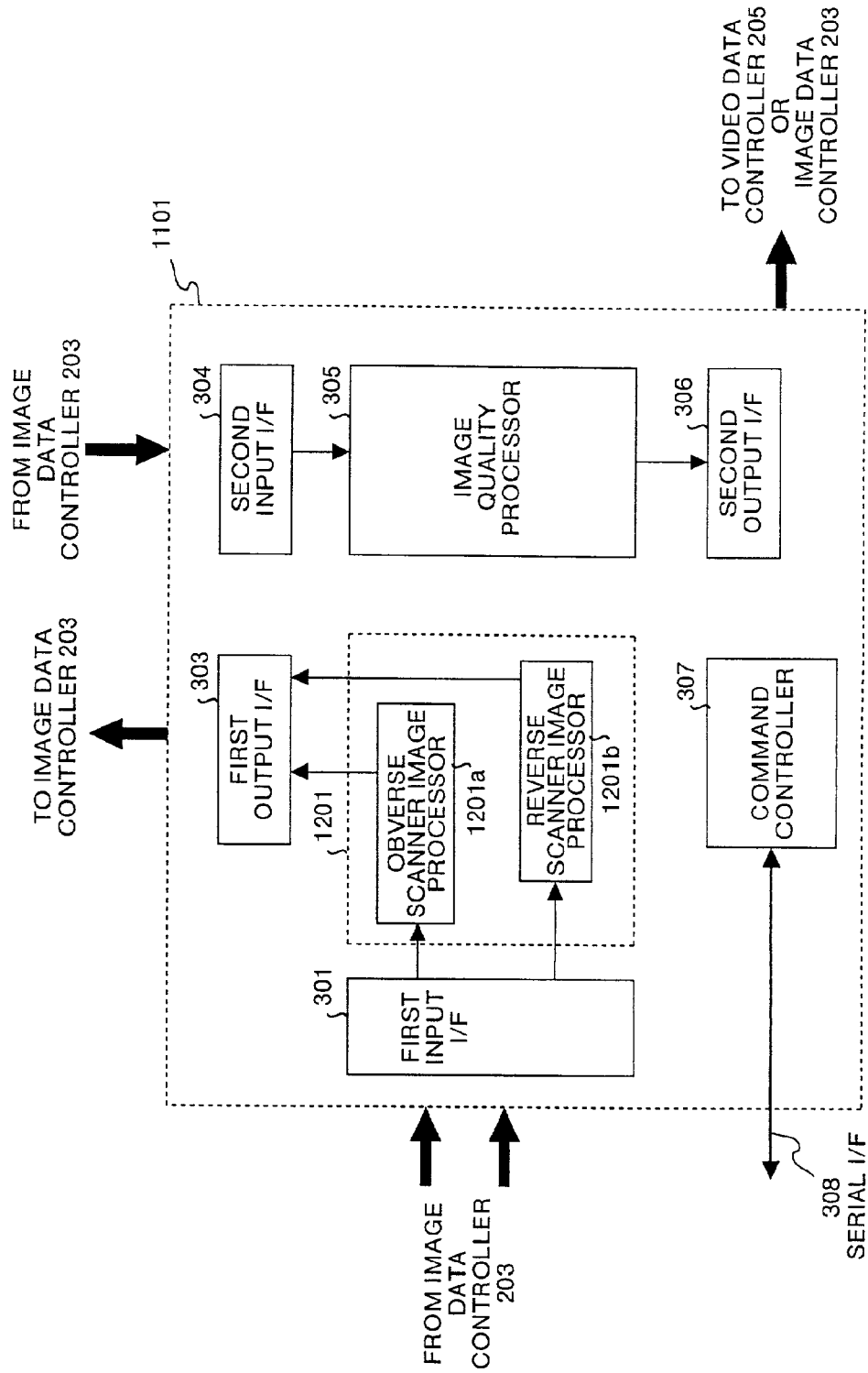
FIG. 12 is a block diagram illustrating one example of the configuration of the image processor illustrated in FIG. 11.

FIG. 11 is a block diagram illustrating another example of the configuration of the image processing apparatus when a single image processor 1101 is used; and FIG. 12 is a block diagram illustrating one example of the configuration of the image processor 1101.

As illustrated in FIG. 12, obverse image data and reverse image data are input into the image processor 1101 from the image data controller 203, and therefore, a scanner image processor 1201 includes an obverse scanner image processor 1201*a* for scanning obverse image data and a reverse scanner image processor 1201*b* for scanning reverse image data. With this configuration, the number of terminals for chips can be reduced, thereby reducing the size of the circuit and the size of the apparatus.

As described above, the processing circuit can be shared in the image processing apparatus in the present embodiment by shifting the timings of the obverse image data processing and the reverse image data processing, so that the processing circuit can be reduced, and further, both of the obverse and reverse of the document can be read at the same time. Namely, only one compressor can compress the obverse and reverse image data by shifting the input timings with respect to the compressor by one line. Furthermore, the provision of the input switch can halve the circuit configuration after the output stage of the input switch.

A second embodiment of the present invention relates to a digital combined machine in which a bus is shared thereby simplifying the circuit configuration. The same component elements as those in the first embodiment are designated by the same legends, and to avoid repetition of matter, their description will be omitted.

Figure 13:
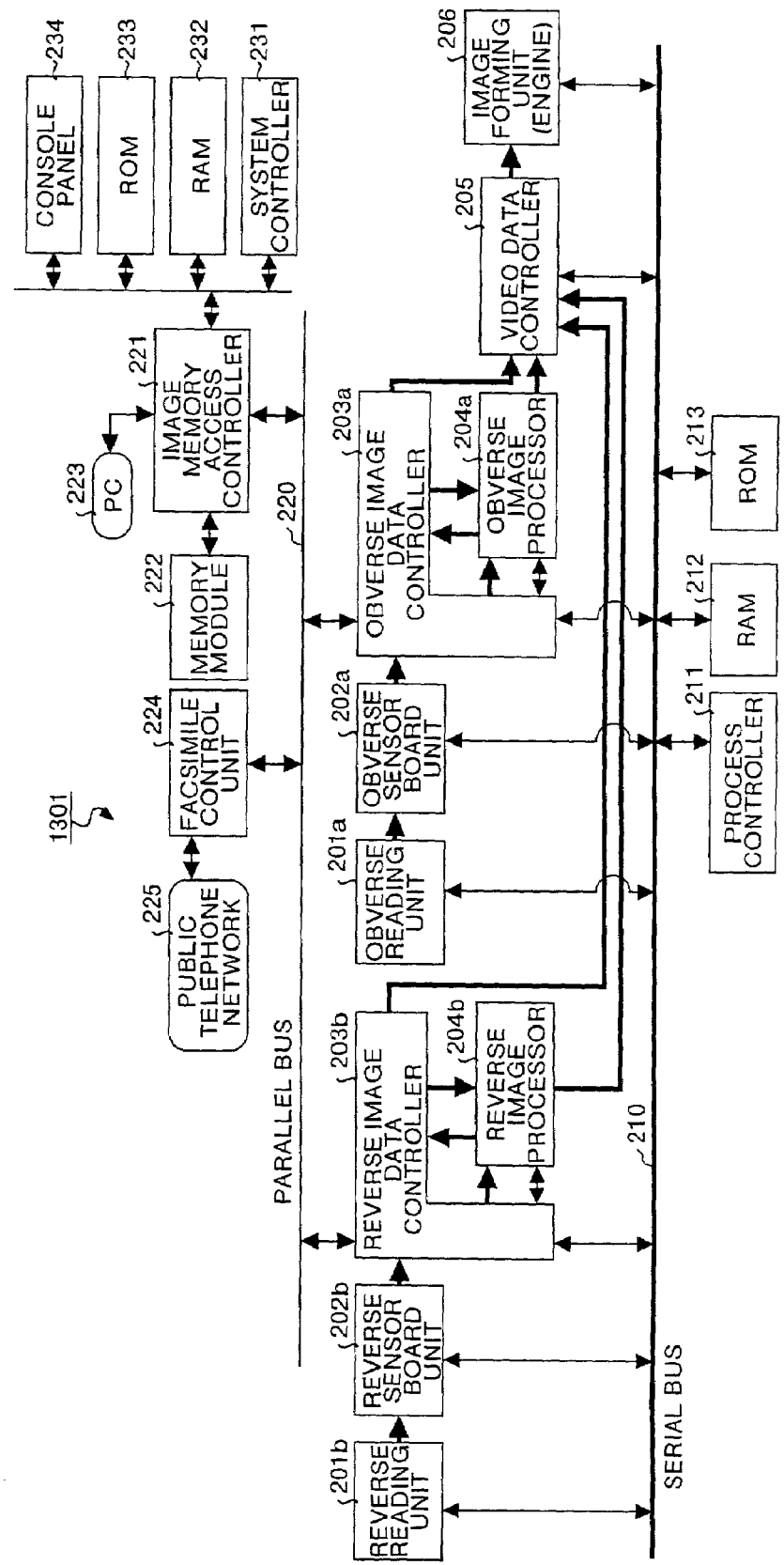
FIG. 13 is a block diagram illustrating one example of the hardware configuration of an image processing apparatus in a second embodiment.

FIG. 13 is a block diagram illustrating one example of the hardware configuration of an image processing apparatus in the second embodiment. The image processing apparatus 1301 comprises component elements for processing image data on an obverse and a reverse, respectively: an obverse reading unit 201*a*, a reverse reading unit 201*b*, an obverse sensor board unit 202*a*, a reverse sensor board unit 202*b*, an obverse image data controller 203*a*, a reverse image data controller 203*b*, an obverse image processor 204*a* and a reverse image processor 204*b*.

The image processing apparatus 1301 illustrated in FIG. 13 merely exemplifies the hardware configuration of the image processing apparatus in the present embodiment, and therefore, the reading units and the like are not necessarily configured in such a manner that the processing of the obverse and the processing of the reverse are independent of each other.

In the image processing apparatus 1301, the obverse image data controller 203*a* and the reverse image data controller 203*b* for respectively controlling flows of the obverse and reverse image data are connected to a common parallel bus 220. Consequently, the obverse and reverse image data can be transmitted or received via a single bus.

Like the image processing apparatus in the first embodiment, the image processing apparatus 1301 is configured per functional unit, and thus, a memory module 222 for storing the image data or the like therein is included inside the image memory control unit 102 independent of the image data control unit 100, to which the image data controller 203 pertains (see FIG. 1). Consequently, compressed image data need be transmitted via a parallel bus 220.

Figure 15:
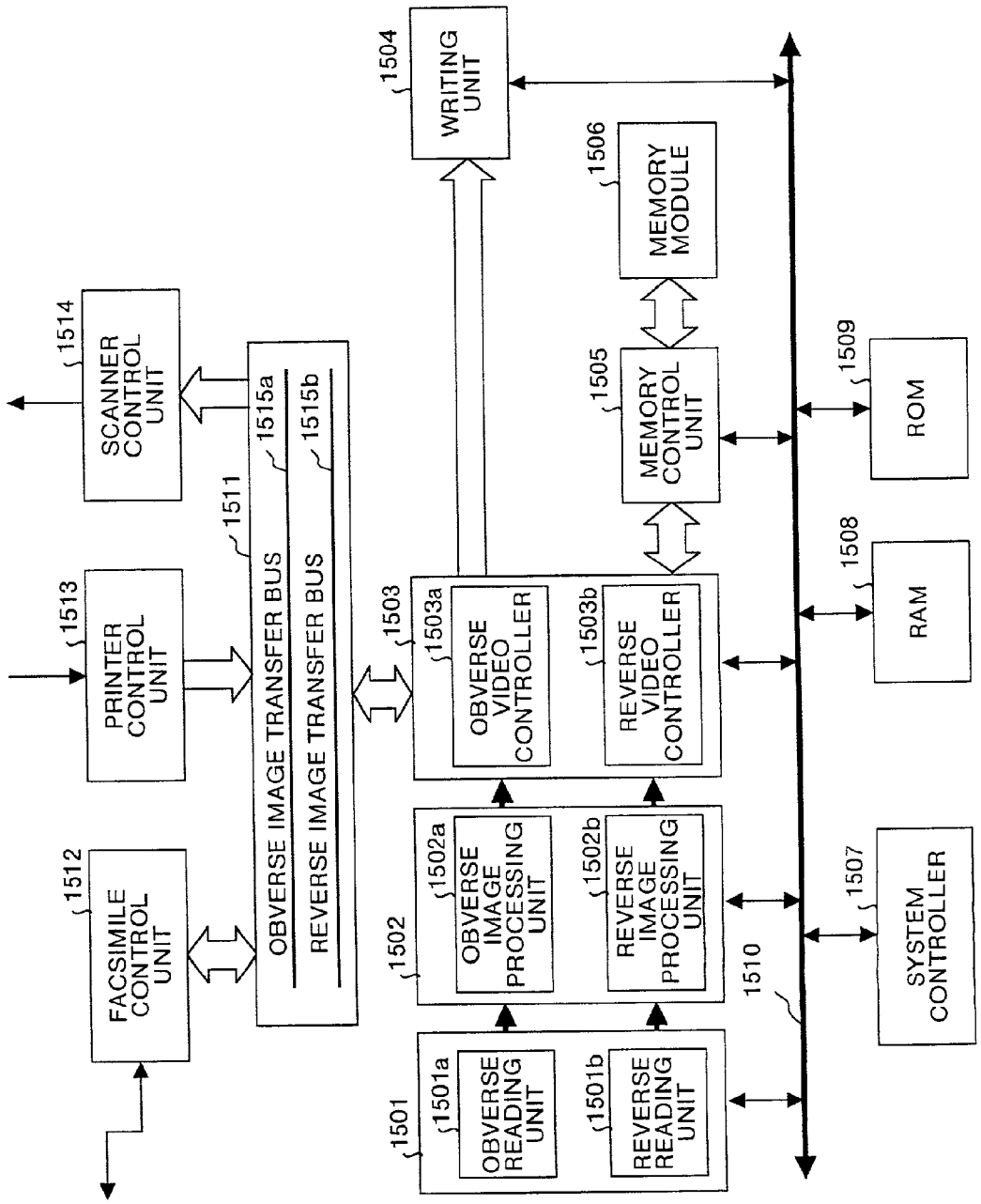
FIG. 15 is a block diagram illustrating one example of configuration of a conventional double-sided copying machine.
Figure 16:
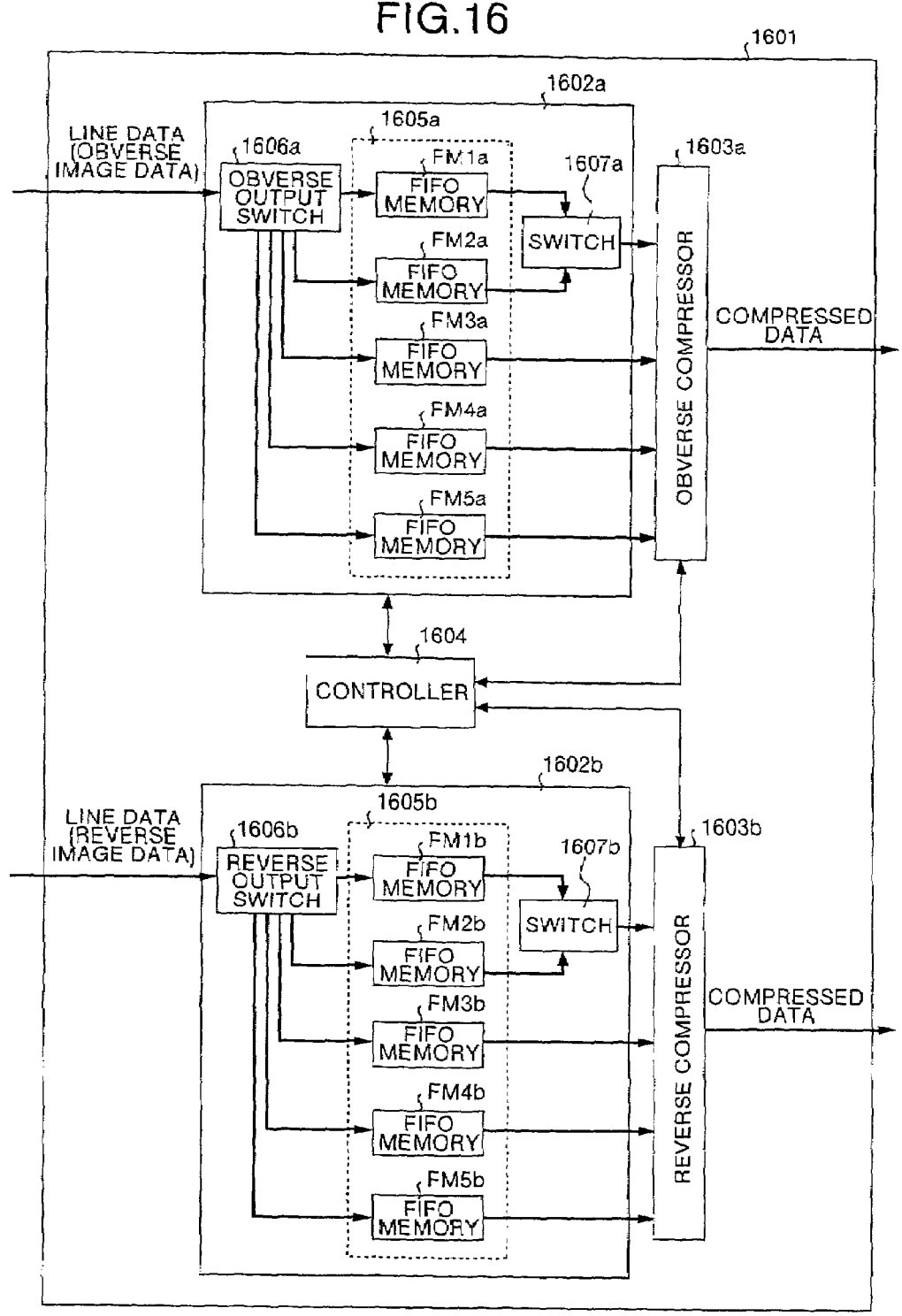
FIG. 16 is a block diagram illustrating one example of the configuration of a data compressor in a conventional memory control unit.
Figure 17:
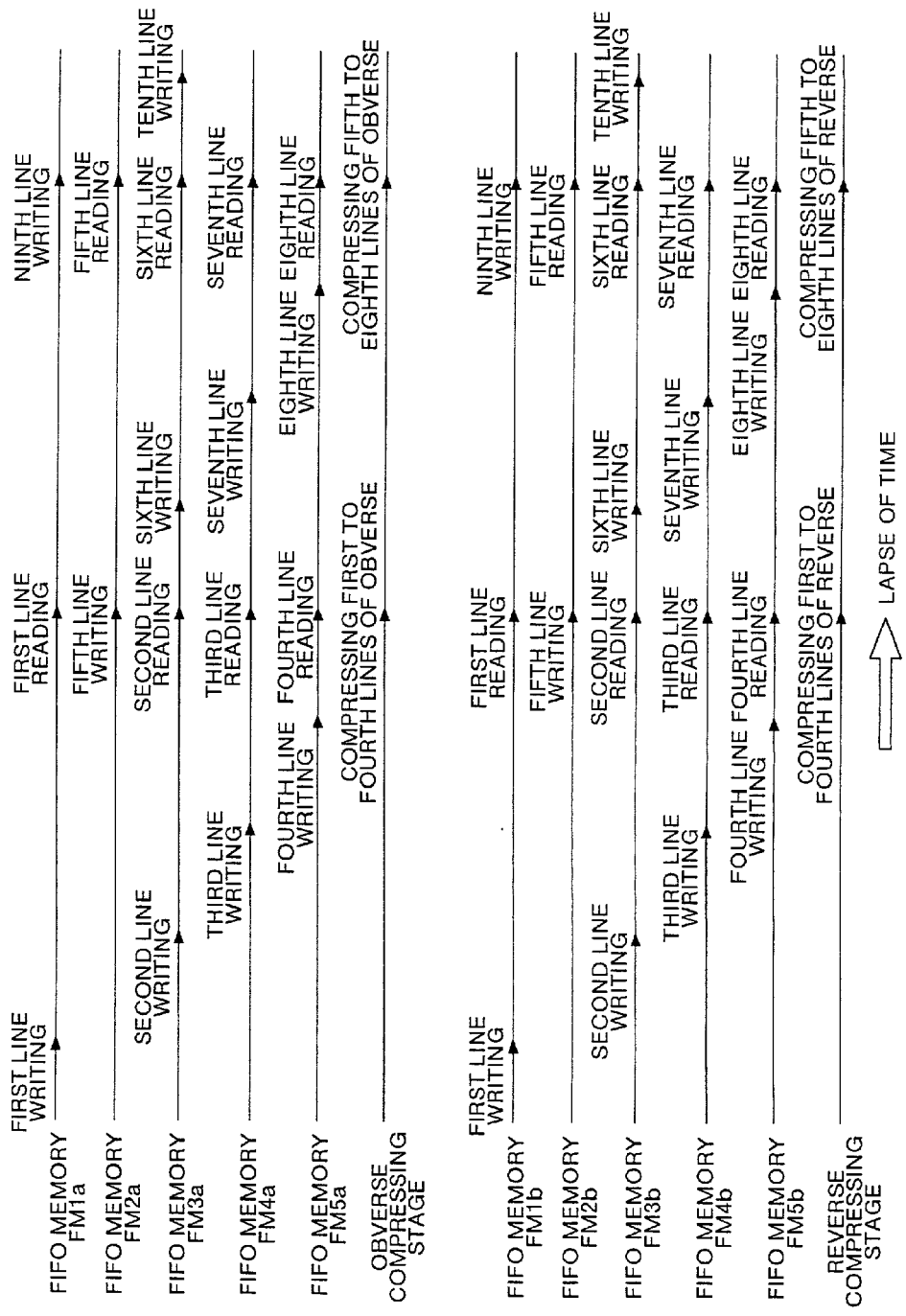
FIG. 17 is a timing chart illustrating the processing timings of the data compressor illustrated in FIG. 16.

In the conventional image processing apparatus, the obverse image data and the reverse image data are transmitted via the buses independent of each other inside the motherboard 1511 (see FIG. 15), i.e., the obverse image transfer bus 1515*a* and the reverse image transfer bus 1515*b*, respectively. Therefore, the size of the apparatus has been inevitably increased. However, in the image processing apparatus 1301 in the present embodiment, the controllers are connected to the single bus (i.e., the parallel bus 220), thereby reducing the size of the circuit.

Figure 14:
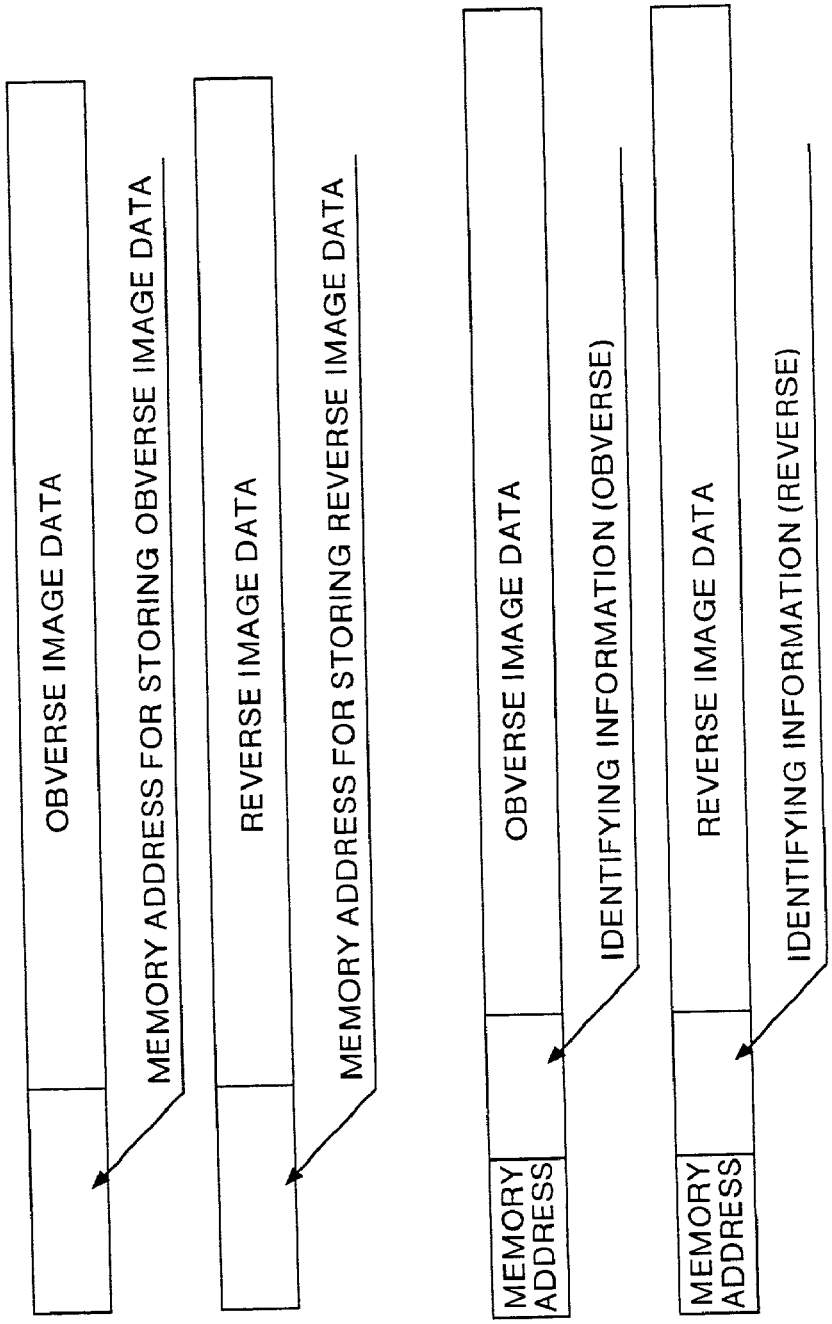
FIG. 14A and FIG. 14B illustrate image data added with identifying data.

At this time, since the obverse image data and the reverse image data are not distinguished from each other on the parallel bus 220, the obverse image data controller 203a and the reverse image data controller 203b add identifying data to the image data. FIG. 14A and FIG. 14B illustrate the image data added with the identifying data.

In FIG. 14A, the identifying data is a memory address itself. The memory module 222 as the storing destination is divided into an area for storing the obverse image data therein and an area for storing the reverse image data therein. In other words, the memory module 222 is divided into the area for storing the obverse image data therein and the area for storing the reverse image data therein, and the identifying data is adapted to designate the storing destination.

In contrast, in FIG. 14B, the identifying data for determining whether the image data is the obverse image data or the reverse image data is added next to the memory address of the storing destination.

As illustrated in FIG. 14A, high-speed memory storing processing can be achieved by determining whether or not it is the obverse image data in each area of the storing destination; in contrast, no waste occurs in the memory by adding an identifier, as illustrated in FIG. 14B.

Thus, since the single bus is used for inputting/outputting the obverse image data and the reverse image data in the image processing apparatus in the present embodiment, the processing circuit can be reduced in size, unlike the prior art in which the two buses are required via the motherboard. Furthermore, since the image data is added with the identifying data, it is easy to determine whether the image data is the obverse image data or the reverse image data.

As described above, according to one aspect of the present invention, the reading unit simultaneously reads the image data on both of the obverse and reverse of the document; the compressing unit subjects the image data to the compressing processing; and the controlling unit controls the timings at which the image data on both of the obverse and reverse of the document are transmitted to the compressing unit in such a manner as to generate the difference in timing between the processing of compressing the obverse image data read by the reading unit and the processing of compressing the reverse image data read by the reading unit. Consequently, the processing circuit can be shared by shifting the timings of the image processing of the obverse image data and the image processing of the reverse image data, thus producing the effect of providing the image processing apparatus in which the processing circuit can be reduced in size, and further, both of the obverse and reverse of the document can be read at the same time.

According to another aspect of the present invention, the reading unit simultaneously reads the image data on both of the obverse and reverse of the document; the storing unit stores therein the image data read by the reading unit; the compressing unit subjects the image data stored in the storing unit to the compressing processing; and the controlling unit controls the storing unit so as to perform, out of the image data to be compressed by the compressing unit, the processing of compressing the obverse image data and the processing of compressing the reverse image data at the different timings. Consequently, it is possible to share the compressing unit for performing the processing of compressing the obverse image data and the processing of compressing the reverse image data, thus producing the effect of providing the image processing apparatus in which the processing circuit can be reduced in size, and further, both of the obverse and reverse of the document can be read at the same time.

According to still another aspect of the present invention, the reading unit simultaneously reads the image data on both of the obverse and reverse of the document; the data dividing unit divides, out of the image data read by the reading unit, each of the obverse image data and the reverse image data into the image data consisting of m×n pixels, i.e., m pixels per line multiplied by n lines; the storing unit stores therein the image data divided by the data dividing unit; the compressing unit compresses the image data consisting of m×n pixels as a single unit; the switch unit connects the storing unit and the compressing unit to each other and switches the image data to be input into the compressing unit between the obverse image data and the reverse image data; and the transmission controlling unit controls the transmission of the image data consisting of m×(n−1) pixels out of the image data consisting of m×n pixels divided by the data dividing unit to the storing unit, the transmission of the image data on the residual one line directly to the compressing unit, and further, the transmission of the image data consisting of m×(n−1) pixels stored in the storing unit to the compressing unit. Consequently, it is possible to share the compressing unit for performing the processing of compressing the obverse image data and the processing of compressing the reverse image data, and to reduce the volume of the image data stored in the storing unit, thus producing the effect of providing the image processing apparatus in which the processing circuit can be reduced in size, and further, both of the obverse and reverse of the document can be read at the same time.

According to still another aspect of the present invention, the reading unit simultaneously reads the image data on both of the obverse and reverse of the document; the obverse image processing unit subjects the obverse image data out of the image data read by the reading unit to the image processing; the reverse image processing unit means subjects the reverse image data out of the image data read by the reading unit to the image processing; the appending unit adds the identifying information for identifying whether the image data read by the reading unit is the obverse image data or the reverse image data; and the communication line connects the obverse image processing unit and the reverse image processing unit to each other, wherein the communication line is used in transmitting or receiving the image data. Consequently, it is possible to identify whether the image data read by the reading unit is the obverse image data or the reverse image data, and to transmit or receive the obverse and reverse image data via the single data bus without any necessity of providing a data bus for each of the obverse processing and the reverse processing, thus producing the effect of providing the image processing apparatus in which the processing circuit can be reduced in size, and further, both of the obverse and reverse of the document can be read at the same time.

The present document incorporates by reference the entire contents of Japanese priority documents, 2000-023132 filed in Japan on Jan. 31, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
a reading unit which simultaneously reads obverse and reverse image data from obverse and reverse surfaces of a document;
a compressing unit which receives and compresses scanning lines of the obverse and reverse image data, respectively; and
a controlling unit which orchestrates a flow of the image data from said reading unit to said compressing unit such that the compressing unit switches between compressing only a portion of the scanning lines of each of the obverse and reverse image data, respectively, until all of the scanning lines of the obverse and reverse image data are compressed.

2. The image processing apparatus according to claim 1, wherein said reading unit includes,
an obverse reading unit which reads image data from the obverse surface of the document; and
a reverse reading unit which reads image data from the reverse surface of the document.

3. An image processing apparatus comprising:
a reading unit which simultaneously reads obverse and reverse image data from obverse and reverse surfaces of a document;
a storing unit which receives and stores therein the image data read by said reading unit;
a compressing unit which receives and compresses scanning lines of the obverse and reverse image data stored in said storing unit, respectively; and
a controlling unit which orchestrates compression of the image data stored in said storing unit by said compressing unit such that the compressing unit switches between compressing only a portion of the scanning lines of each of the obverse and reverse image data, respectively, until all of the scanning lines of the obverse and reverse image data are compressed.

4. The image processing apparatus according to claim 3, wherein said reading unit includes,
an obverse reading unit which reads image data from the obverse surface of the document; and
a reverse reading unit which reads image data from the reverse surface of the document.

5. An image processing apparatus comprising:
a reading unit which simultaneously reads obverse and reverse image data from obverse and reverse surfaces of a document;
a data dividing unit which divides the image data acquired by said reading unit from the obverse surface and reverse surface respectively into image data of m×n pixels, where n is the number of lines and m is the number of pixels in one line;
a storing unit which receives the image data of first m×(n−1) pixels, corresponding to the obverse surface and the reverse surface, from said data dividing unit, and stores the data therein;
a compressing unit which receives the image data of m×n pixels and compresses the image data as a single unit;
a switch unit which controls a flow of the image data from said storing unit to said compressing unit, wherein said switch unit allows either the image data corresponding to the obverse surface or the reverse surface to be input into said compressing unit at one time; and
a transmission controlling unit which controls a flow of the image data from said data dividing unit to said storing unit and to said compressing unit, wherein said transmission controlling unit allows the image data of first m×(n−1) pixels from said data dividing unit to be input into said storing unit, and allows the image data of last m pixels from said data dividing unit to be directly input into said compressing unit.

6. The image processing apparatus according to claim 5, wherein said reading unit includes,
an obverse reading unit which reads image data from the obverse surface of the document; and
a reverse reading unit which reads image data from the reverse surface of the document.

7. The image processing apparatus according to claim 5, wherein the magnitudes to m and n are decided based on the amount of data said compressing unit can compressed at one time.

8. An image processing apparatus comprising:
a reading unit which simultaneously reads obverse and reverse image data from obverse and reverse surfaces of a document;
a data dividing unit which divides the image data acquired by said reading unit from the obverse surface and reverse surface respectively into image data of m×n pixels, where n is the number of lines and m is the number of pixels in one line, and n<N and m<M where N is the maximum number of scan lines, and M is the maximum number of pixels in one lines;
a storing unit which receives the image data of first m×(n−1) pixels, corresponding to the obverse surface and the reverse surface, from said data dividing unit, and stores the data therein;
a switch unit which allows either the image data corresponding to the obverse surface or the image data corresponding to the reverse surface to be input into said compressing unit at one time; and
a compressing unit which receives the image data of first m×(n−1) pixels, corresponding to either the obverse surface or the reverse surface, from said data storing unit, receives the image data of last m pixels directly from said data dividing unit.

9. The image processing apparatus according to claim 8, wherein said reading unit includes,
an obverse reading unit which reads image data from the obverse surface of the document; and
a reverse reading unit which reads image data from the reverse surface of the document.

10. The image processing apparatus according to claim 8, wherein the magnitudes to m and n are decided based on the amount of data said compressing unit can compressed at one time.

11. An image processing apparatus comprising:
a reading unit which simultaneously reads obverse and reverse image data from obverse and reverse surfaces of a document;
an obverse image processing unit which subjects the image data corresponding to the obverse surface to a specific image processing;
a reverse image processing unit which subjects the image data corresponding to the reverse surface to a specific image processing;
an appending unit which appends identifying information to the image data, the identifying information identifying whether the image data read by the reading unit is the image data corresponding to the obverse surface or the image data corresponding to the reverse surface; and
a single communication line which directly connects to said obverse image processing unit and to said reverse image processing unit, the communication line being used in transmitting or receiving the image data with the appended identifying information.

12. The image processing apparatus according to claim 11, wherein said reading unit includes,
an obverse reading unit which reads image data from the obverse surface of the document; and
a reverse reading unit which reads image data from the reverse surface of the document.

13. An image processing apparatus comprising:
a reading unit which simultaneously reads obverse and reverse image data from obverse and reverse surfaces of a document;
an appending unit which receives the image data acquired by said reading unit appends identifying information to the image data, the identifying information identifying whether the image data corresponds to the obverse surface or to the reverse surface; and
a communication line to be used to send the image data with the appended identifying information;
an obverse image processing unit which obtains, based on the appended identifying information, only the image data corresponding to the obverse surface from said communication line, and performs specific image processing to the obtained image data; and
a reverse image processing unit which obtains, based on the appended identifying information, only the image data corresponding to the reverse surface from said communication line, and performs specific image processing to the obtained image data.

14. The image processing apparatus according to claim 13, wherein said reading unit includes,
an obverse reading unit which reads image data from the obverse surface of the document; and
a reverse reading unit which reads image data from the reverse surface of the document.

15. An image processing apparatus comprising:
a reading means for simultaneously reading obverse and reverse image data from obverse and reverse surfaces of a document;
a compressing means for receiving and compressing scanning lines of the obverse and reverse image data, respectively; and
a controlling means for orchestrating a flow of the image data from said reading means to said compressing means such that the compressing means switches between compressing only a portion of the scanning lines of each of the obverse and reverse image data, respectively, until all of the scanning lines of the obverse and reverse image data are compressed.

16. The image processing apparatus according to claim 15, wherein said reading means includes,
an obverse reading means for reading image data from the obverse surface of the document; and
a reverse reading means for reading image data from the reverse surface of the document.

17. An image processing apparatus comprising:
a reading means for simultaneously reading obverse and reverse image data from obverse and reverse surfaces of a document;
a storing means for receiving and storing therein the image data read by said reading means;
a compressing means for receiving and compressing scanning lines of the obverse and reverse image data stored in said storing means, respectively; and
a controlling means for orchestrating compression of the image data stored in said storing means such that the compressing means switches between compressing only a portion of the scanning lines of each of the obverse and reverse image data, respectively, until all of the scanning lines of the obverse and reverse image data are compressed.

18. The image processing apparatus according to claim 17, wherein said reading means includes,
an obverse reading means for reading image data from the obverse surface of the document; and
a reverse reading means for reading image data from the reverse surface of the document.

19. An image processing apparatus comprising:
a reading means for simultaneously reading obverse and reverse image data from obverse and reverse surfaces of a document;
a data dividing means for dividing the image data acquired by said reading means from the obverse surface and reverse surface respectively into image data of m×n pixels, where n is the number of lines and m is the number of pixels in one line;
a storing means for receiving the image data of first m×(n−1) pixels, corresponding to the obverse surface and the reverse surface, from said data dividing means, and storing the data therein;
a compressing means for receiving the image data of m×n pixels and compresses the image data as a single means;
a switch means for controlling a flow of the image data from said storing means to said compressing means, wherein said switch means allows either the image data corresponding to the obverse surface or the reverse surface to be input into said compressing means at one time; and
a transmission controlling means for controlling a flow of the image data from said data dividing means to said storing means and to said compressing means, wherein said transmission controlling means allows the image data of first m×(n−1) pixels from said data dividing means to be input into said storing means, and allows the image data of last m pixels from said data dividing means to be directly input into said compressing means.

20. The image processing apparatus according to claim 19, wherein said reading means includes,
an obverse reading means for reading image data from the obverse surface of the document; and
a reverse reading means for reading image data from the reverse surface of the document.

21. The image processing apparatus according to claim 19, wherein the magnitudes to m and n are decided based on the amount of data said compressing means can compressed at one time.

22. An image processing apparatus comprising:
a reading means for simultaneously reading obverse and reverse image data from obverse and reverse surfaces of a document;
a data dividing means for dividing the image data acquired by said reading means from the obverse surface and reverse surface respectively into image data of m×n pixels, where n is the number of lines and m is the number of pixels in one line, and n<N and m<M where N is the maximum number of scan lines, and M is the maximum number of pixels in one lines;
a storing means for receiving the image data of first m×(n−1) pixels, corresponding to the obverse surface and the reverse surface, from said data dividing means, and stores the data therein;

a switch means for allowing either the image data corresponding to the obverse surface or the image data corresponding to the reverse surface to be input into said compressing means at one time; and a compressing means for receiving the image data of first m×(n−1) pixels, corresponding to either the obverse surface or the reverse surface, from said data storing means, receives the image data of last m pixels directly from said data dividing means.

23. The image processing apparatus according to claim 22, wherein said reading means includes, an obverse reading means for reading image data from the obverse surface of the document; and a reverse reading means for reading image data from the reverse surface of the document.

24. The image processing apparatus according to claim 22, wherein the magnitudes to m and n are decided based on the amount of data said compressing means can compressed at one time.

25. An image processing apparatus comprising:

a reading means for simultaneously reading obverse and reverse image data from obverse and reverse surfaces of a document;

an obverse image processing means for subjecting the image data corresponding to the obverse surface to a specific image processing;

a reverse image processing means for subjecting the image data corresponding to the reverse surface to a specific image processing;

an appending means for appending identifying information to the image data, the identifying information identifying whether the image data read by the reading means is the image data corresponding to the obverse surface or the image data corresponding to the reverse surface; and a single communication line for directly connecting to said obverse image processing means and to said reverse image processing means, the communication line being used in transmitting or receiving the image data with the appended identifying information.

26. The image processing apparatus according to claim 25, wherein said reading means includes, an obverse reading means for reading image data from the obverse surface of the document; and a reverse reading means for reading image data from the reverse surface of the document.

27. An image processing apparatus comprising:

a reading means for simultaneously reading obverse and reverse image data from obverse and reverse surfaces of a document;

an appending means for receiving the image data acquired by said reading means and for appending identifying information to the image data, the identifying information identifying whether the image data corresponds to the obverse surface or to the reverse surface; and a communication line to be used to send the image data with the appended identifying information;

an obverse image processing means for obtaining, based on the appended identifying information, only the image data corresponding to the obverse surface from said communication line, and performs specific image processing to the obtained image data; and a reverse image processing means for obtaining, based on the appended identifying information, only the image data corresponding to the reverse surface from said communication line, and performs specific image processing to the obtained image data.

28. The image processing apparatus according to claim 27, wherein said reading means includes, an obverse reading means for reading image data from the obverse surface of the document; and a reverse reading means for reading image data from the reverse surface of the document.

* * * * *